US012770333B2

(12) United States Patent
Liu

(10) Patent No.: US 12,770,333 B2
(45) Date of Patent: Oct. 20, 2026

(54) THREE-DIMENSIONAL MODEL EXPANSION METHODS AND SYSTEMS

(71) Applicant: Tencent Technology (Shenzhen) Company Limited, Shenzhen (CN)

(72) Inventor: Haoyu Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 155 days.

(21) Appl. No.: 18/664,404

(22) Filed: May 15, 2024

(65) Prior Publication Data

US 2024/0338895 A1 Oct. 10, 2024

Related U.S. Application Data

(63) Continuation of application No. PCT/CN2023/119421, filed on Sep. 16, 2023.

(30) Foreign Application Priority Data

Sep. 26, 2022 (CN) ........................ 202211171681.9

(51) Int. Cl.
*G06T 17/20* (2006.01)

(52) U.S. Cl.
CPC .................................. *G06T 17/205* (2013.01)

(58) Field of Classification Search
None
See application file for complete search history.

(56) References Cited

U.S. PATENT DOCUMENTS 10,755,441 B1 8/2020 Shieh et al.
2014/0253551 A1 9/2014 Schmidt
(Continued)

FOREIGN PATENT DOCUMENTS

CN 112085750 A 12/2020
CN 112561788 A 3/2021
(Continued)

OTHER PUBLICATIONS

Liu et al., A Local/Global Approach to Mesh Parameterization, Eurographics Symposium on Geometry Processing 2008, vol. 27 (2008), No. 5, (Year: 2008).*
(Continued)

*Primary Examiner* — Kee M Tung
*Assistant Examiner* — Biao Chen
(74) *Attorney, Agent, or Firm* — Banner & Witcoff, Ltd.

(57) ABSTRACT

This application provides an expansion method and an expansion apparatus for a three-dimensional model, a device, a computer-readable storage medium and a computer program product. The method includes: obtaining an initial expansion result of a to-be-expanded three-dimensional model, where none of a plurality of triangular patches included in the initial expansion result is flipped; determining a rigid transformation matrix of each triangular patch based on coordinate information of each triangular patch in the expansion result; determining first corrected coordinate information of each triangular patch based on the rigid transformation matrix of each triangular patch and a first energy function; when it is determined, based on the first corrected coordinate information of each triangular patch, that there is a flipped triangular patch, second corrected coordinate information of each triangular patch is determined based on the rigid transformation matrix of each triangular patch and a second energy function; and determining a target expansion result based on the second corrected coordinate information of each triangular patch when it is determined that a preset convergence condition is met.

22 Claims, 9 Drawing Sheets

(56) References Cited

U.S. PATENT DOCUMENTS

| | | | |
|---|---|---|---|
| 2015/0187135 A1 | 7/2015 | Magder et al. | |
| 2020/0007914 A1* | 1/2020 | Peng | H04M 1/72448 |
| 2021/0170693 A1* | 6/2021 | Sinclair | B33Y 30/00 |

FOREIGN PATENT DOCUMENTS

| | | |
|---|---|---|
| CN | 114241151 A | 3/2022 |
| CN | 114445564 A | 5/2022 |
| CN | 114494668 A | 5/2022 |
| CN | 114943818 A | 8/2022 |
| CN | 115294258 A | 11/2022 |

OTHER PUBLICATIONS

Poranne et al., Autocuts: Simultaneous Distortion and Cut Optimization for UV Mapping. ACM Transactions on Graphics, vol. 36, No. 6, Article 215. Publication date: Nov. 2017 (Year: 2017).*

Dec. 25, 2023—(PCT) International Search Report and Written Opinion—PCT/CN2023/119421.

* cited by examiner

THREE-DIMENSIONAL MODEL EXPANSION METHODS AND SYSTEMS

RELATED APPLICATIONS

This application claims priority to PCT Application PCT/CN2023/119421, filed Sep. 18, 2023, which in turn claims priority to Chinese Patent Application No. 202211171681.9, filed on Sep. 26, 2022, each of which is incorporated herein by reference in its entirety.

FIELD OF THE TECHNOLOGY

This application relates to model processing technologies, and in particular, to an expansion method and an expansion apparatus for a three-dimensional model, a device, a computer-readable storage medium, and a computer program product.

BACKGROUND OF THE DISCLOSURE

In most UV expansion solutions in an existing game art production procedure, a method provided by various three-dimensional modeling software is directly used. A general operation procedure is to manually select, on a model, a partition on which UV expansion needs to be performed, and then use a UV expansion method provided by the software to obtain a UV result. The selected partition generally has a simple shape. Currently, when two-dimensional expansion is performed on a three-dimensional model, an "as-rigid-as-possible" method and a "least squares conformal" method are generally used. However, in a related technology, prevention of flipping is not considered when two-dimensional expansion is performed on the three-dimensional model. As a result, a UV expansion may result in the model being flipped, which causes a local overlap in a two-dimensional expansion result. Consequently, different regions in a three-dimensional mesh correspond to the same region in the two-dimensional expansion result, and different information cannot be stored in the different regions in the three-dimensional mesh, leading to information loss.

SUMMARY

Aspects of this application provide an expansion method and an expansion apparatus for a three-dimensional model, a device, a computer-readable storage medium, and a computer program product, so that a two-dimensional expansion result without flipping can be obtained, thereby improving quality of the expansion result.

The technical solutions of aspects of this application are implemented in the following manners.

An aspect of this application provides an expansion method for a three-dimensional model. The method is applied to a computer device, and includes:

obtaining an initial expansion result of a to-be-expanded three-dimensional model, where none of a plurality of triangular patches included in the initial expansion result is flipped;

determining a rigid transformation matrix of each triangular patch based on coordinate information of each triangular patch in the initial expansion result;

determining a deformation matrix of each triangular patch based on the rigid transformation matrix of each triangular patch and a first energy function;

determining corrected coordinate information of each triangular patch based on the rigid transformation matrix of each triangular patch and a second energy function when it is determined, based on the deformation matrix of each triangular patch, that there is a flipped triangular patch, where the second energy function includes the first energy function and an obstacle function component that can prevent the triangular patch from flipping; and determining the second corrected coordinate information of each triangular patch as a target expansion result when it is determined that a preset convergence condition is met.

An aspect of this application provides an expansion apparatus for a three-dimensional model, including:

a first obtaining module, configured to obtain an initial expansion result of a to-be-expanded three-dimensional model, where none of a plurality of triangular patches included in the initial expansion result is flipped;

a first determining module, configured to determine a rigid transformation matrix of each triangular patch based on coordinate information of each triangular patch in the initial expansion result;

a second determining module, configured to determine first corrected coordinate information of each triangular patch based on the rigid transformation matrix of each triangular patch and a first energy function;

a third determining module, configured to determine second corrected coordinate information of each triangular patch based on the rigid transformation matrix of each triangular patch and a second energy function when it is determined, based on the first corrected coordinate information of each triangular patch, that there is a flipped triangular patch, where the second energy function includes the first energy function and an obstacle function component that can prevent the triangular patch from flipping; and a fourth determining module, configured to determine a target expansion result based on the second corrected coordinate information of each triangular patch when it is determined that a preset convergence condition is met.

An aspect of this application provides a computer device, including:

a memory, configured to store executable instructions; and a processor, configured to implement, when executing the executable instructions stored in the memory, the expansion method for a three-dimensional model provided in aspects of this application.

An aspect of this application provides a computer-readable storage medium, storing executable instructions. When the executable instructions are executed by a processor, the expansion method for a three-dimensional model provided in aspects of this application is implemented.

An aspect of this application provides a computer program product, including a computer program or instructions. When the computer program or instructions are executed by a processor, the expansion method for a three-dimensional model provided in aspects of this application is implemented.

Aspects of this application have the following beneficial effects:

In the expansion method for a three-dimensional model provided in aspects of this application, first, the initial expansion result of the to-be-expanded three-dimensional model is obtained, where the triangular patches included in the initial expansion result are not flipped. Then, the rigid transformation matrix of each triangular patch is determined based on the coordinate information of each triangular patch in the initial expansion result, and the first corrected coordinate information of each triangular patch is determined based on the rigid transformation matrix of each triangular patch and the first energy function. When it is determined, based on the first corrected coordinate information of each triangular patch, that there is a flipped triangular patch, the second corrected coordinate information of each triangular patch is determined based on the rigid transformation matrix of each triangular patch and the second energy function, where the second energy function includes the first energy function and the obstacle function component. The obstacle function component can prevent the expanded triangular patch from flipping, in other words, in this case, in the expansion result obtained based on the corrected coordinate information of each triangular patch, none of the triangular patches is flipped. Finally, if it is determined that the preset convergence condition is met, the target expansion result is determined based on the corrected coordinate information of each triangular patch, to ensure that the obtained target expansion result does not include a flipped triangular patch, thereby improving the quality of the expansion result.

DETAILED DESCRIPTION

Figure 1:
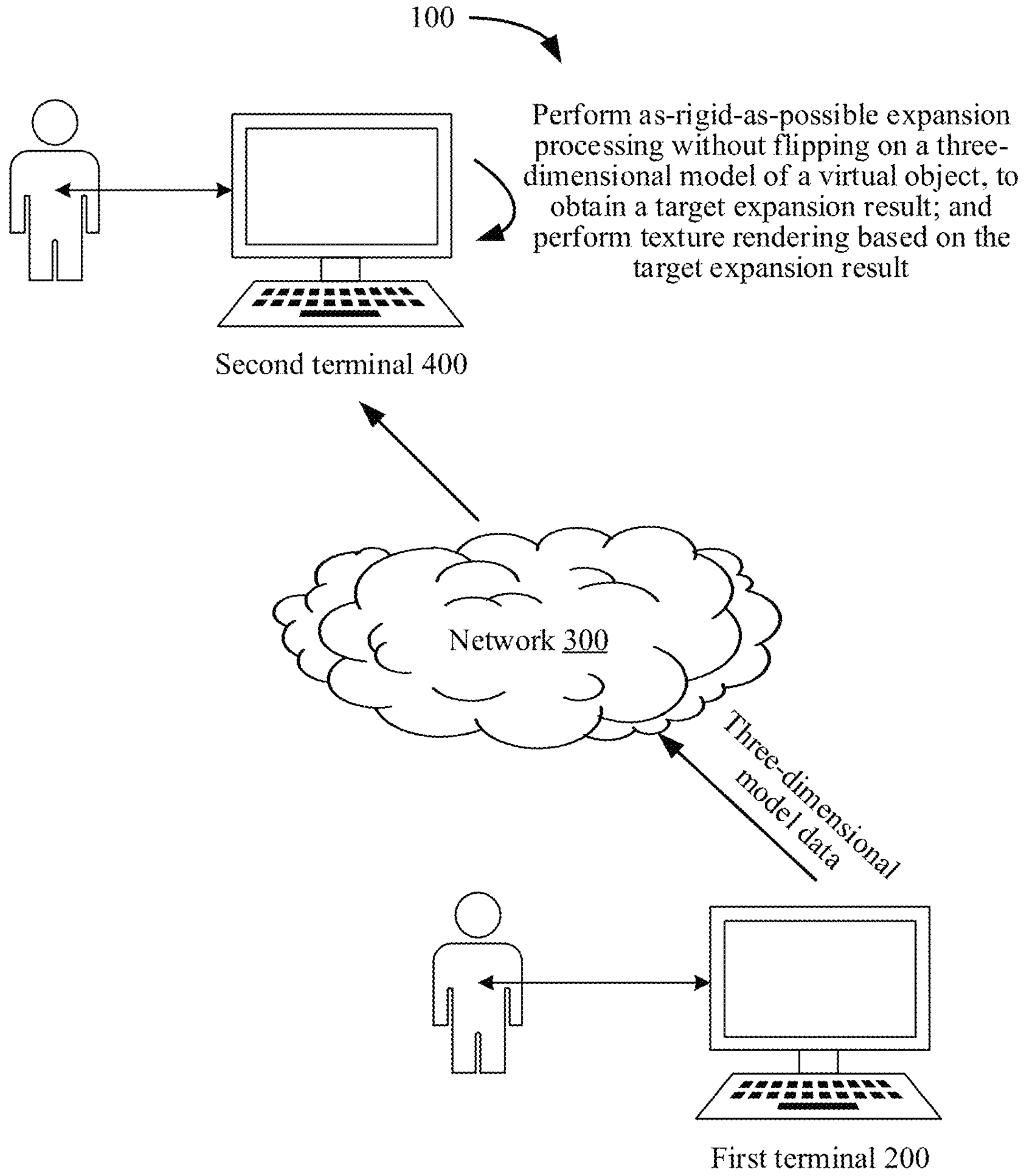
FIG. 1 is a schematic diagram of a network architecture of a virtual object rendering system 100 according to one or more illustrative aspects described herein.

To make the objectives, technical solutions, and advantages of this application clearer, the following further describes this application in detail with reference to the accompanying drawings. The described aspects are not to be considered as a limitation to this application. All other aspects obtained by a person of ordinary skill in the art without creative efforts shall fall within the protection scope of this application.

In the following descriptions, "some aspects" describes a subset of all possible aspects. However, it may be understood that the "some aspects" may be the same subset or different subsets of all the possible aspects, and may be combined with each other without conflict.

In the following descriptions, the comprised terms "first", "second", "third" are merely intended to distinguish similar objects, but do not indicate a specific order of an object. It may be understood that "first", "second", "third" are interchangeable in terms of a specific order or sequence if permitted, so that aspects of this application described herein can be implemented in other orders than the order illustrated or described herein.

Unless otherwise defined, meanings of all technical and scientific terms used in this specification are the same as meanings generally understood by a person skilled in the technical field to which this application belongs. Terms used in this specification are merely intended to describe objectives of aspects of this application, but are not intended to limit this application.

Before aspects of this application are further described in detail, terms involved in aspects of this application are described. The terms provided in aspects of this application are applicable to the following explanations.

(1) Three-dimensional model: The three-dimensional model is a three-dimensional object in to-be-rendered three-dimensional space. During rendering, only a visual feature of a model is generally concerned, in other words, an interior of the three-dimensional object is not a concerned object. Therefore, the three-dimensional model also generally refers to a polygonal representation of a surface of the three-dimensional object.

(2) Mesh: The mesh is a discrete expression form for a three-dimensional model surface in a computer. The three-dimensional model surface is represented as a combination of a vertex, an edge and a surface. The vertex is a point in three-dimensional space, the edge is a straight line connecting two vertices, and the surface is a polygon surrounded by edges.

(3) Triangle mesh: The triangle mesh is a mesh whose surfaces are all triangle.

(4) Texture: The texture is mesh information such as a color or a normal stored in a two-dimensional plane, and is usually in a form of a picture. The texture is widely used in the rendering field.

(5) UV: The UV is a two-dimensional mesh that represents a correspondence between a three-dimensional mesh and a two-dimensional texture.

(6) UV expansion: The UV expansion is a process of finding a two-dimensional mesh corresponding to a given mesh in three-dimensional space.

(7) UV without flipping: The UV without flipping refers to that a normal of each surface of the UV is consistent with normals of all surfaces around it.

(8) Distortion of UV expansion: The distortion of UV expansion is a deformation caused by flattening between a surface on a three-dimensional mesh and a corresponding surface on a UV.

(9) As-rigid-as-possible UV expansion: The as-rigid-as-possible UV expansion is an algorithm of the UV expansion for a triangle mesh, which makes a shape of a triangular surface on a three-dimensional mesh and a corresponding triangular surface on a UV as consistent as possible in a process of the UV expansion, thereby alleviating a distortion.

For a problem of poor UV expansion quality caused by flipping of a triangular patch when a three-dimensional model is expanded in a related technology, an aspect of this application provides an expansion method for a three-dimensional model. The method can fully automatically perform an as-rigid-as-possible UV expansion without flipping on a triangle mesh. In other words, the method can quickly generate, with no need for manual modification, various models with a slit into a UV with a lower degree of distortion, and can ensure that there is no flipping. Based on ensuring that a generation time meets a requirement, the problem of poor UV expansion quality caused by flipping and a high degree of distortion is avoided.

The following describes an example application of the computer device provided in aspects of this application. The device provided in aspects of this application may be implemented as various types of user terminals such as a notebook computer, a tablet computer, a desktop computer, a set-top box, or a mobile device (for example, a mobile phone, a portable music player, a personal digital assistant, a dedicated messaging device, or a portable game device), or may be implemented as a server. An example application in which the device is implemented as a terminal is described below.

FIG. 1 is a schematic diagram of a network architecture of a virtual object rendering system 100 according to an aspect of this application. As shown in FIG. 1, the system includes a first terminal 200, a network 300, and a second terminal 400. The first terminal 200 establishes a communication connection with the second terminal 400 through a network, and the network 300 may be a wide area network or a local area network, or a combination thereof.

A user may use the first terminal 200 to complete a three-dimensional model design of a virtual object. The virtual object may be a virtual object in a game scene, in a virtual reality scene or in an augmented reality scene, for example, the virtual object may be a virtual character, a virtual building, or a virtual plant. The virtual object displayed in the virtual scene is obtained by performing texture mapping on a three-dimensional model of the virtual object by using a texture mapping technology, which can improve authenticity and vividness of the virtual object displayed in a game screen. In this aspect of this application, after completing the three-dimensional model design of the virtual object, the first terminal 200 sends data of the three-dimensional model to the second terminal 400, and the second terminal 400 may perform two-dimensional expansion on the three-dimensional model of the virtual object to obtain an expansion result. During implementation, the second terminal 400 obtains an initial expansion result of a to-be-expanded three-dimensional model, none of triangular patches included in the initial expansion result is flipped; determines a rigid transformation matrix of each triangular patch based on coordinate information of each triangular patch in the expansion result; determines a deformation matrix of each triangular patch based on the rigid transformation matrix of each triangular patch and a first energy function; determines corrected coordinate information of each triangular patch based on the rigid transformation matrix of each triangular patch and a second energy function when it is determined, based on the deformation matrix of each triangular patch, that there is a flipped triangular patch, where the second energy function includes the first energy function and an obstacle function component; and determines a target expansion result based on the corrected coordinate information of each triangular patch when it is determined that a preset convergence condition is met, and then performs texture rendering based on the target expansion result.

In some aspects, the first terminal 200 and the second terminal 400 may be the same terminal, in other words, functions of object design and texture rendering are completed by using the same terminal. In some aspects, the second terminal 400 may alternatively obtain a to-be-rendered three-dimensional virtual object from a server. The second terminal 400 performs expansion processing on the three-dimensional virtual object to obtain the target expansion result, and performs texture rendering based on the target expansion result.

The server herein may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a CDN, big data, and an artificial intelligence platform. The first terminal 200 and the second terminal 400 may be a smartphone, a tablet computer, a notebook computer, a desktop computer, a smart speaker, a smart watch, a vehicle-mounted intelligent terminal and the like, but is not limited thereto. The terminal and the server may be directly or indirectly connected in a wired or wireless communication manner. This is not limited in this aspect of this application.

Figure 2:
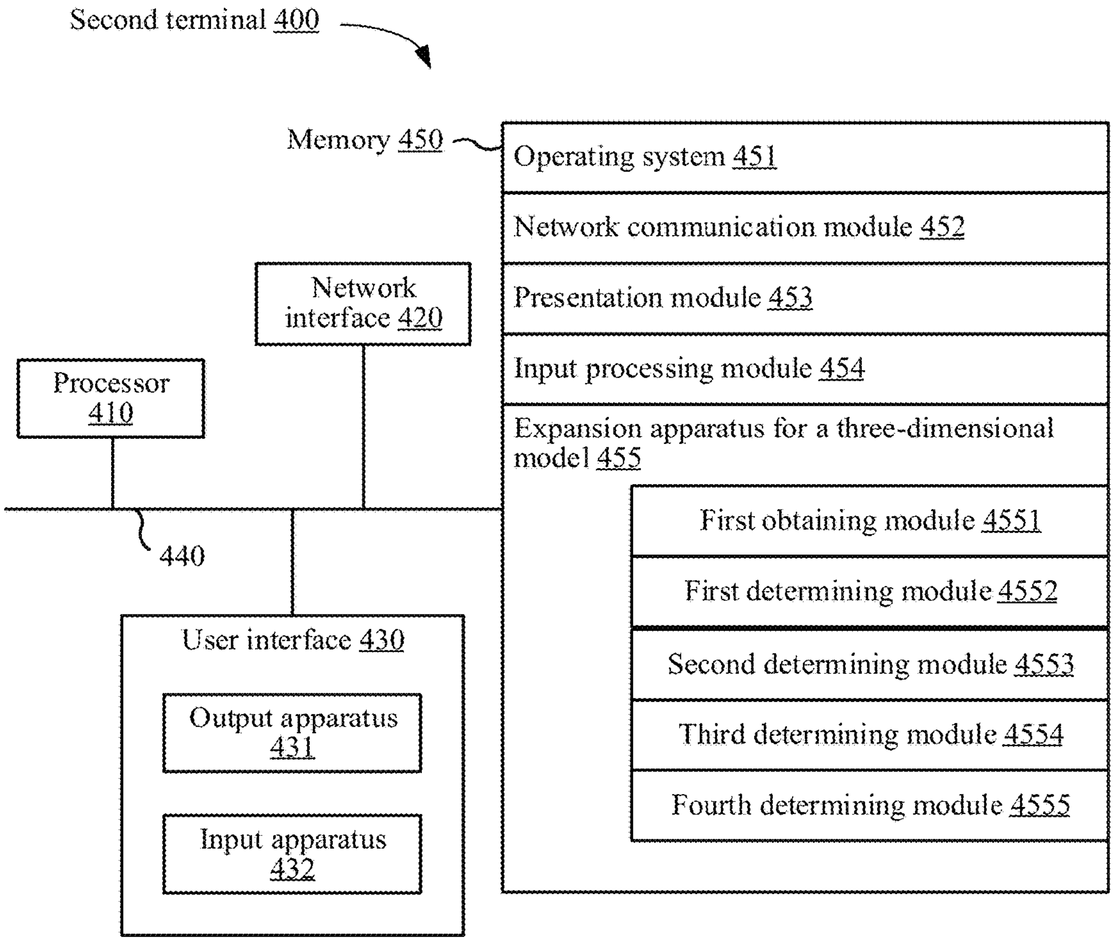
FIG. 2 is a schematic diagram of a structure of a second terminal 400 according to one or more illustrative aspects described herein.

FIG. 2 is a schematic diagram of a structure of a second terminal 400 according to an aspect of this application. The second terminal 400 shown in FIG. 2 includes at least one processor 410, a memory 450, at least one network interface 420, and a user interface 430. All the components in the terminal 400 are coupled together by using a bus system 440. It may be understood that, the bus system 440 is configured to implement connection and communication between the components. In addition to a data bus, the bus system 440 further includes a power bus, a control bus, and a state signal bus. However, for a clear description, all types of buses are marked as the bus system 440 in FIG. 2.

The processor 410 may be an integrated circuit chip having a signal processing capability. For example, the processor 410 may be a general purpose processor, a digital signal processor (DSP), or another programmable logic device, discrete gate, transistor logical device, or discrete hardware component. The general purpose processor may be a microprocessor or any conventional processor.

The user interface 430 includes one or more output apparatuses 431 that can display media content, including one or more loudspeakers and/or one or more visual display screens. The user interface 430 further includes one or more input apparatuses 432, including a user interface component that facilitate inputting for a user, such as a keyboard, a mouse, a microphone, a touch display screen, a camera, and other input buttons and controls.

The memory 450 may be a removable memory, a non-removable memory, or a combination thereof. For example, a hardware device includes a solid-state memory, a hard disk driver, an optical disc driver, or the like. The memory 450 optionally includes one or more storage devices away from the processor 410 in a physical position.

The memory 450 includes a volatile memory or a non-volatile memory, or may include both the volatile memory and the non-volatile memory. The non-volatile memory may be a read-only memory (ROM). The volatile memory may be a random access memory (RAM). The memory 450 described in this aspect of this application is to include any other suitable types of memories.

In some aspects, the memory 450 may store data to support various operations. Examples of the data include a program, a module, and a data structure, or a subset or a superset thereof, which are described below by using examples.

An operating system 451 includes a system program configured to process various basic system services and perform a hardware-related task, such as a framework layer, a core library layer, or a driver layer, and is configured to implement various basic services and process a hardware-based task.

A network communication module 452 is configured to reach another computing device through one or more (wired or wireless) network interfaces 420. For example, the network interface 420 includes: Bluetooth, wireless fidelity (Wi-Fi), a universal serial bus (USB), and the like.

A presentation module 453 is configured to display information by using one or more output apparatus 431 (for example, a display screen or a loudspeaker) associated with the user interface 430 (for example, a user interface configured to operate a peripheral device and display content and information).

An input processing module 454 is configured to detect one or more user inputs or interactions from one of the one or more input apparatuses 432 and translate the detected input or interaction.

In some aspects, the apparatus provided in aspects of this application may be implemented in a form of software. FIG. 2 shows an expansion apparatus 455 of a three-dimensional model stored in the memory 450, which may be software in a form of a program, a plug-in, or the like, including the following software modules: a first obtaining module 4551, a first determining module 4552, a second determining module 4553, a third determining module 4554, and a fourth determining module 4555. The modules are logical and therefore can be combined or further divided in any way based on a to-be-implemented function. The following describes functions of each module.

In some other aspects, the apparatus provided in aspects of this application may be implemented in a form of hardware. For example, the apparatus provided in aspects of this application may be a processor in a form of a hardware decoding processor, programmed to perform the expansion method for a three-dimensional model provided in aspects of this application. For example, the processor in the form of a hardware decoding processor may use one or more application-specific integrated circuit (ASIC), a DSP, a programmable logic device (PLD), a complex programmable logic device (CPLD), a field-programmable gate array (FPGA), or other electronic components.

The expansion method for a three-dimensional model provided in aspects of this application is to be described with reference to an example application and implementation of the terminal provided in this aspect of this application.

Figure 3:
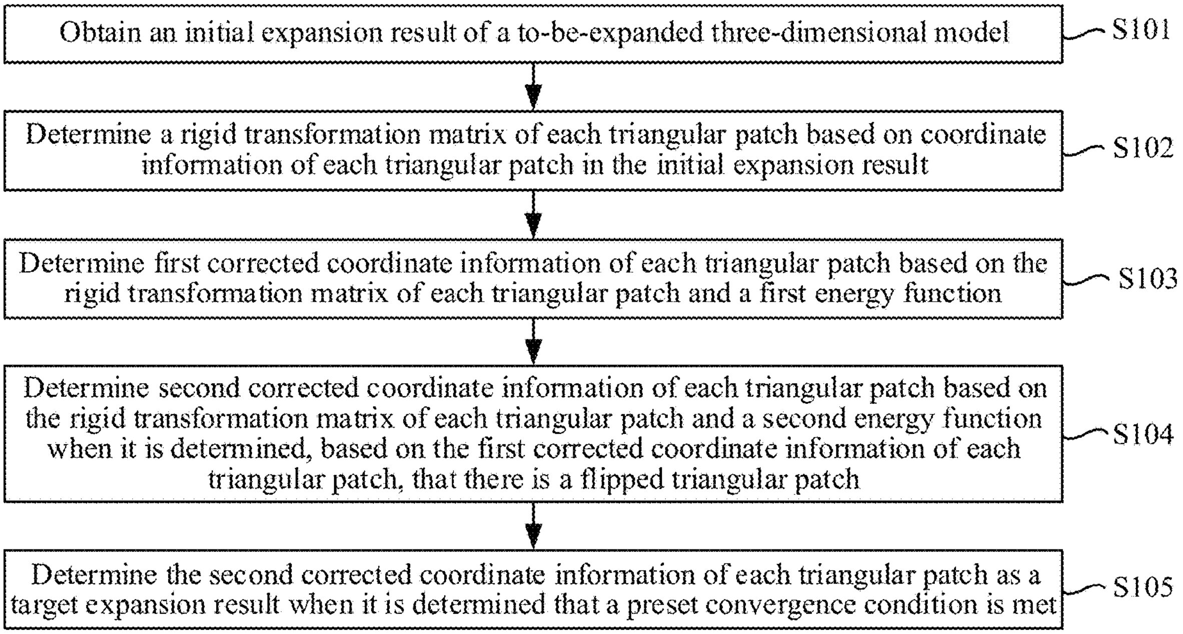
FIG. 3 is a schematic diagram of an implementation procedure of an expansion method for a three-dimensional model according to one or more illustrative aspects described herein.

An aspect of this application provides an expansion method for a three-dimensional model. The method is applied to a computer device. The computer device may be a terminal or a server, and aspects of this application use an example in which the computer device is the terminal for description. FIG. 3 is a schematic diagram of an implementation procedure of an expansion method for a three-dimensional model according to an aspect of this application. Each step of the expansion method for a three-dimensional model provided in aspects of this application is described below with reference to FIG. 3.

Step S101: Obtain an initial expansion result of a to-be-expanded three-dimensional model.

The to-be-expanded three-dimensional model may be a three-dimensional model corresponding to a virtual object in a game scene, or a three-dimensional model corresponding to a virtual object in a virtual reality scene or an augmented reality scene. The virtual object may be a virtual character, a virtual building, a virtual plant or the like, and the virtual object displayed in the virtual scene is obtained by performing texture mapping on the three-dimensional model of the virtual object by using a texture mapping technology. To implement texture mapping on the three-dimensional model, the three-dimensional model is expanded to obtain a two-dimensional expansion result, and then each triangular patch included in the two-dimensional expansion result is texture mapped.

During implementation of this step, a conformal mapping algorithm may be used to perform two-dimensional expansion on the three-dimensional model to obtain a candidate expansion result, and whether any triangular patch in the candidate expansion result is flipped is determined. In some aspects, candidate coordinate information of each triangular patch is obtained based on the candidate expansion result, and the candidate coordinate information is a two-dimensional coordinate. Then, three-dimensional coordinate information corresponding to each triangular patch is obtained, and a deformation matrix of each triangular patch and a determinant of each deformation matrix are determined based on the candidate coordinate information and the three-dimensional coordinate information of each triangular patch. When each determinant is greater than 0, it is determined that there is no flipped triangular patch in the candidate expansion result. In this case, the candidate expansion result is determined as the initial expansion result. When there is a determinant less than or equal to 0, it is determined that there is a flipped triangular patch in the candidate expansion result. In this case, another expansion algorithm (for example, a "Tutte embedding" algorithm) that can ensure a non-flipping may be used to expand the three-dimensional model to obtain the initial expansion result. Therefore, a plurality of triangular patches included in the initial expansion result are not flipped. In this aspect of this application, the initial expansion result includes vertex identifiers and coordinate information of vertices included in each triangular patch.

Step S102: Determine a rigid transformation matrix of each triangular patch based on coordinate information of each triangular patch in the initial expansion result.

In some aspects, the coordinate information of each triangular patch (corresponding to a UV coordinate in other aspects) may be obtained from the initial expansion result, and a three-dimensional coordinate corresponding to the triangular patch may be obtained from model information of the three-dimensional model. Then, a two-dimensional coordinate of the triangular patch in a local coordinate system of on a plane in which the triangular patch is located and the deformation matrix of each triangular patch are determined, and each deformation matrix is subjected to singular value decomposition. Finally, based on a decomposition result, a rotation transformation matrix of each triangular patch is determined.

In this aspect of this application, the deformation matrix is a linear transformation matrix mapping from a local two-dimensional coordinate on the plane in which the triangular patch is located to a two-dimensional UV coordinate, and the rigid transformation matrix is a rotation transformation matrix on a two-dimensional plane.

Step S103: Determine first corrected coordinate information of each triangular patch based on the rigid transformation matrix of each triangular patch and a first energy function.

In this aspect of this application, the first energy function may be represented by using Formula (1-1):

$$E = \sum_T A_T \|J_T - R_T\|_F^2 \tag{1-1}$$

$A_T$ represents an area of a triangular patch T, which is determined based on the three-dimensional coordinate corresponding to the triangular patch. $J_T$ represents a deformation matrix of the triangular patch T, where the deformation matrix of the triangular patch may be represented by the three-dimensional coordinate and the two-dimensional coordinate of the triangular patch, and Ry represents a rigid transformation matrix corresponding to the triangular patch T. The rigid transformation matrix corresponding to the triangular patch T has been determined in step S102. Therefore, in Formula (1-1), $A_T$ and $R_T$ are both known quantities, and $J_T$ needs to be solved. $J_T$ is represented by the local two-dimensional coordinate corresponding to the three-dimensional coordinate of the triangular patch and a two-dimensional UV coordinate. The three-dimensional coordinate of the triangular patch is known. Therefore, the two-dimensional UV coordinate of each triangular patch, in other words, the first corrected coordinate information of each triangular patch, may be determined by performing minimization solving on the first energy function.

Step S104: Determine second corrected coordinate information of each triangular patch based on the rigid transformation matrix of each triangular patch and a second energy function when it is determined, based on the first corrected coordinate information of each triangular patch, that there is a flipped triangular patch.

Before performing this step, it is necessary to determine whether there is a flipped triangular patch. During implementation, first the deformation matrix of each triangular patch is determined based on the first corrected coordinate information of each triangular patch, then the determinant of the deformation matrix of each triangular patch is obtained, and finally whether each determinant is greater than 0 is determined. When there is no determinant less than 0, it is determined that there is no flipped triangular patch, and whether a convergence condition is met can be determined in this case. If it is determined that the convergence condition is met, corrected coordinate information obtained in this iteration is determined as a target expansion result. When there is a determinant less than 0, it is determined that there is a flipped triangular patch. Then, minimization solving needs to be performed on the second energy function based on the rigid transformation matrix of each triangular patch, to obtain a minimum energy value corresponding to this iteration and obtain the corrected coordinate information of each triangular patch when the minimum energy value is reached. In this aspect of this application, the second energy function includes the first energy function and an obstacle function component, which may be represented by using Formula (1-2):

$$E = \sum_T A_T \|J_T - R_T\|_F^2 + \lambda \sum_T A_T B(J_T) \tag{1-2}$$

$$\sum_T A_T B(J_T)$$

is the obstacle function component, $B(J_T)$ in the obstacle function component uses a symmetric Dirichlet energy, and the obstacle function component can prevent the triangular patch from flipping.

Step S105: Determine the second corrected coordinate information of each triangular patch as the target expansion result when it is determined that the preset convergence condition is met.

In some aspects, at least two of the following manners can be used to determine whether the convergence condition is met.

First manner: Obtain a preset energy threshold, and determine that the preset convergence condition is met when a minimum energy value corresponding to this iteration is less than the energy threshold.

Second manner: Obtain a preset energy difference threshold, determine an energy difference between a minimum energy value corresponding to previous iteration and a minimum energy value corresponding to this iteration, and when the energy difference is less than the energy difference threshold, determine that the preset convergence condition is met.

When it is determined that the preset convergence condition is met, this indicates that the second corrected coordinate information of each triangular patch obtained by this iteration can be determined as the target expansion result.

In some aspects, when it is determined that the convergence condition is not met, the rigid transformation matrix of each triangular patch is determined again based on the second corrected coordinate information of each triangular patch obtained in this iteration, and then the rigid transformation matrix of each triangular patch is determined as a known quantity. Then, the first energy function or the second energy function is minimized to obtain the corrected coordinate information of each triangular patch. This iteration is continued until an algorithm convergence condition is met.

In the expansion method for a three-dimensional model provided in this aspect of this application, first, the initial expansion result of the to-be-expanded three-dimensional model is obtained, where the triangular patches included in the initial expansion result are not flipped. Then, the rigid transformation matrix of each triangular patch is determined based on the coordinate information of each triangular patch in the initial expansion result, and the deformation matrix of each triangular patch is determined based on the rigid transformation matrix of each triangular patch and the first energy function. When it is determined, based on the deformation matrix of each triangular patch, that there is a flipped triangular patch, the corrected coordinate information of each triangular patch is determined based on the rigid transformation matrix of each triangular patch and the second energy function, where the second energy function includes the first energy function and the obstacle function component. The obstacle function component can prevent the expanded triangular patch from flipping, in other words, in this case, in the expansion result obtained based on the corrected coordinate information of each triangular patch, none of the triangular patches is flipped. Finally, if it is determined that the preset convergence condition is met, the target expansion result is determined based on the corrected coordinate information of each triangular patch. None of the triangular patches is flipped in the initial expansion result, and the rigid transformation matrix is determined based on the coordinate information of each triangular patch. Therefore, an as-rigid-as-possible two-dimensional expansion is implemented. If it is determined that there is a flipped triangular patch, the second energy function including the obstacle function component and the rigid transformation matrix are used again to solve the deformation matrix to obtain the corrected coordinate information of each triangular patch until the convergence condition is met, to ensure that the obtained target expansion result does not include a flipped triangular patch, thereby improving the quality of the expansion result.

Figure 4:
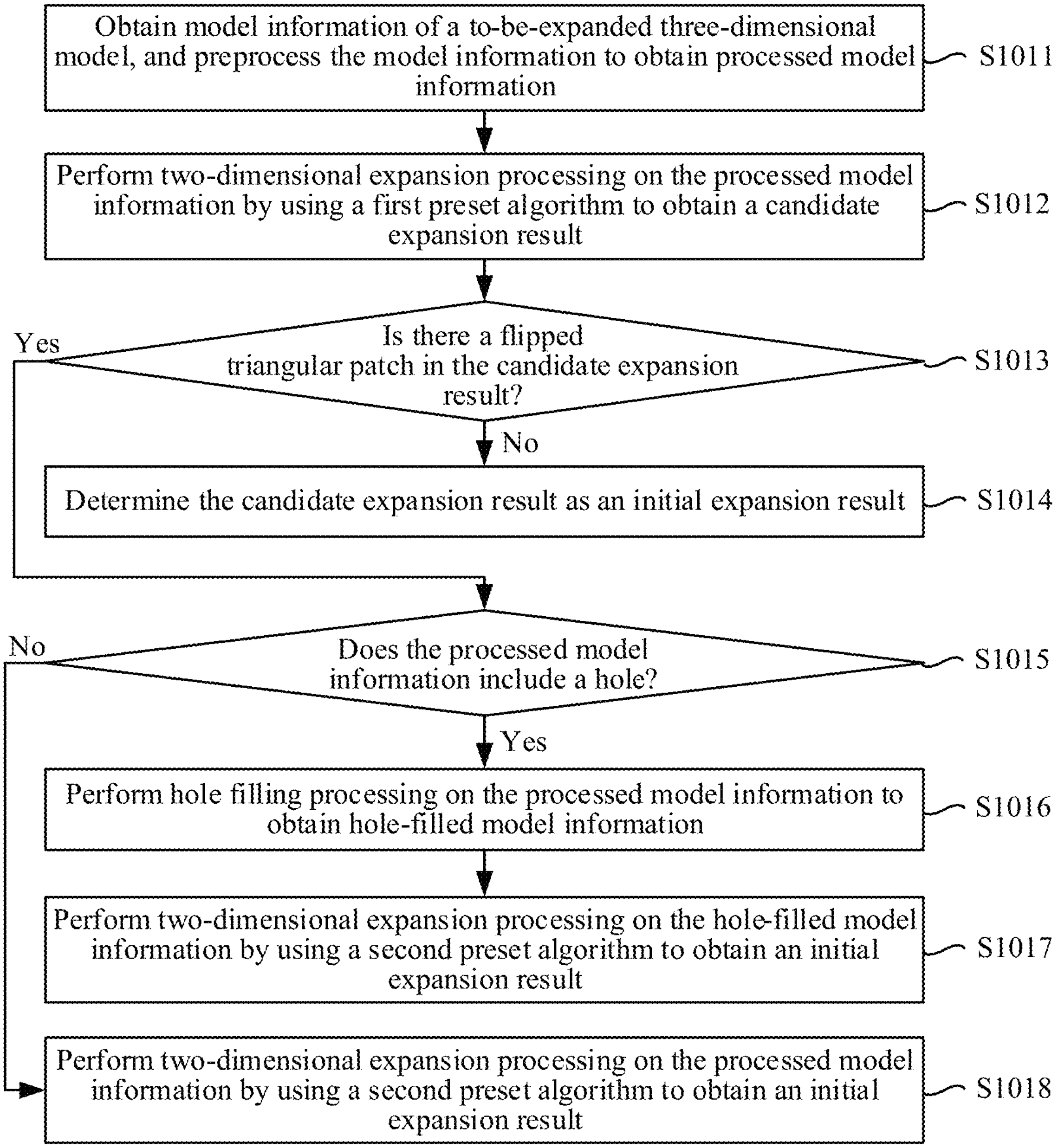
FIG. 4 is a schematic diagram of an implementation procedure of obtaining an initial expansion result according to one or more illustrative aspects described herein.

In some aspects, the “Obtain an initial expansion result of a to-be-expanded three-dimensional model” in the foregoing step S101 may be implemented by steps S1011 to S1018 shown in FIG. 4. The following describes each step with reference to FIG. 4.

Step S1011: Obtain model information of the to-be-expanded three-dimensional model, and preprocess the model information to obtain a processed model information.

The model information of the to-be-expanded three-dimensional model may include vertex identifiers and vertex indexes of a plurality of triangular patches that form the three-dimensional model. The three-dimensional coordinate information of the triangular patch may be obtained through the vertex index, and the three-dimensional coordinate information includes three-dimensional coordinates of three vertices of the triangular patch.

Because not any three-dimensional model can be performed with a two-dimensional expansion, an algorithm of two-dimensional expansion generally requires that a mesh region of the three-dimensional model is an orientable and manifold triangle mesh whose geometric topology is a disc with or without a hole and does not include a degenerate surface. Therefore, the three-dimensional model needs to be preprocessed before expanded. To preprocess the three-dimensional model, first whether the mesh region included in the three-dimensional model meets an expansion condition is determined. In this aspect of this application, the expansion condition may include that the triangle mesh is orientable, a manifold, and a geometric topology is a disc with or without a hole. If the three-dimensional model meets the expansion condition, the area of each triangle mesh is determined, and a triangle mesh with an area of 0 is deleted to obtain the processed model information.

Step S1012: Perform two-dimensional expansion processing on the processed model information by using a first preset algorithm to obtain a candidate expansion result.

The first preset algorithm is a conformal mapping method. The conformal mapping can also be referred to as an angle preserving mapping, which refers to that an angle between two vectors at each point remains unchanged after two surfaces are mapped compared with before the mapping. The first preset algorithm may be a least squares conformal mapping algorithm. The least squares conformal mapping algorithm does not require a fixed boundary for two-dimensional expansion, and a minimum value of an objective function used can minimize an angular deformation of an expanded triangular patch. Therefore, the candidate expansion result obtained by this algorithm have a lower degree of angular distortion, but a larger degree of area distortion. The least squares conformal mapping algorithm can handle the mesh region whose geometric topology is a disc with or without a hole, but may cause flipping.

Step S1013: Determine whether there is a flipped triangular patch in the candidate expansion result.

During implementation of this step, the candidate coordinate information of each triangular patch is obtained based on the candidate expansion result, and the candidate coordinate information is the two-dimensional coordinate. Then, the three-dimensional coordinate information corresponding to each triangular patch is obtained, and the deformation matrix of each triangular patch and the determinant of each deformation matrix are determined based on the candidate coordinate information and the three-dimensional coordinate information of each triangular patch. When each determinant is greater than 0, it is determined that there is no flipped triangular patch in the candidate expansion result. In this case, step S1014 is performed. When there is a determinant less than or equal to 0, it is determined that there is a flipped triangular patch in the candidate expansion result. In this case, step S1015 is performed.

Step S1014: Determine the candidate expansion result as the initial expansion result.

Step S1015: Determine whether the processed model information includes a hole.

In some aspects, the triangle mesh is composed of a series of vertices and a triangular patch formed by these vertices. An edge of the mesh can be obtained from the triangular patch. Generally, one edge is connected to two triangular patches, and this edge is referred to as an internal edge of the mesh. If an edge is connected to only one triangular patch, this edge is referred to as a mesh boundary edge. To determine whether the processed model information includes a hole, a plurality of mesh boundary edges are determined based on the processed model information, and whether the plurality of mesh boundary edges can be connected end-to-end to obtain at least one closed hole is determined. If the plurality of mesh boundary edges can be connected end-to-end to obtain the at least one closed hole, it is determined that the processed model information includes a hole, and step S1016 is performed. If the plurality of mesh boundary edges cannot form the at least one closed hole, it is determined that the processed model information does not include a hole, and step S1018 is performed.

For example, assuming that the processed model information includes four mesh boundary edges, namely e1, e2, e3 and e4, where two vertices of e1 are A and B, two vertices of e2 are B and D, two vertices of e3 are C and A, and two vertices of e4 are D and C. It is clear that, e1-e2-e4-e3-e1 can form a closed hole. Therefore, it can be determined that the processed model information includes a hole. Assuming that the processed model information includes three mesh boundary edges, namely e1, e2, and e3, where two vertices of e1 are A and B, two vertices of e2 are B and D, and two vertices of e3 are C and A. In this case, the three mesh boundary edges cannot form a closed hole. Therefore, the processed model information does not include a hole.

Step S1016: Perform hole filling processing on the processed model information to obtain hole-filled model information.

In this aspect of this application, a second preset algorithm can only be used to expand a mesh region without a hole. Therefore, in this step, the hole filling processing needs to be performed on the processed model information. During implementation of the hole filling processing, holes included in the processed model information are first determined, and a center point of each hole in three-dimensional space is determined. Then, each vertex of the hole is connected to a corresponding center point to obtain the hole-filled model information.

Step S1017: Perform two-dimensional expansion processing on the hole-filled model information by using the second preset algorithm to obtain the initial expansion result.

The second preset algorithm is an expansion method without flipping. The second preset algorithm may be a "Tutte embedding" algorithm, or another expansion algorithm that can ensure a non-flipping. This is not limited in aspects of this application.

Step S1018: Perform two-dimensional expansion processing on the processed model information by using the second preset algorithm to obtain the initial expansion result.

Because the second preset algorithm is the expansion method without flipping, there is no flipped triangular patch in the initial expansion result obtained by using the second preset algorithm to perform two-dimensional expansion processing on the processed model information.

In the foregoing aspect including steps S1011 to S1018, first the to-be-expanded three-dimensional model is preprocessed to ensure that the processed model information meets the expansion condition and there is no degenerate surface with an area of 0. Then, the conformal mapping algorithm with a fast processing speed is used to perform two-dimensional expansion on the processed model information to obtain the candidate expansion result. If there is a flipped triangular patch in the candidate expansion result, the second preset algorithm that can ensure a non-flipping is further used to perform two-dimensional expansion processing on the processed model information to obtain the initial expansion result without a flipped triangular patch. In this way, both the processing efficiency and that the initial expansion result without a flipped triangular patch is obtained are ensured, thereby providing a necessary data basis for finally obtaining the target expansion result without flipping.

In some aspects, the "preprocess the model information to obtain a processed model information" in the foregoing step S1011 may be implemented through the following steps.

Step S111: Determine whether the model information meets the expansion condition.

The expansion condition includes that the model is orientable, the model does not include a non-manifold edge and a non-manifold vertex, and a geometric topology is a disc with or without a hole. When it is determined that the model information meets the expansion condition, step S112 is performed. When it is determined that the model information does not meet the expansion condition, step S115 is performed.

In this aspect of this application, the orientability requires that the three-dimensional model cannot include non-orientable adjacent surfaces. The non-orientable adjacent surfaces refer to that normals of two adjacent surfaces are opposite. During implementation, the two adjacent surfaces are rotated along a common edge to the same plane. In this case, the two adjacent surfaces are on each side of the common edge, and then it is determined whether the normals of the two adjacent surfaces are opposite in this case. The non-manifold edge refers to a common edge with more than two adjacent surfaces, and the non-manifold vertex refers to a vertex whose adjacent surfaces are not connected and form a whole in a manner of edge adjacency. To determine whether the geometric topology is a disc with or without a hole, it can be determined whether a sum of Euler characteristic and a quantity of boundaries is two, and the quantity of boundaries is greater than 0. When the sum of the Euler characteristic and the quantity of boundaries is two and the quantity of boundaries is greater than 0, this indicates that the geometric topology is a disc with or without a hole. The Euler characteristic is a topological invariant, and the Euler characteristic=quantity of vertices−quantity of edges+quantity of surfaces.

Step S112: Determine the area of each triangle mesh based on the model information.

In this aspects of this application, the triangle mesh refers to a triangular surface in a three-dimensional model, and the triangular patch refers to a triangular surface in a two-dimensional model. During implementation of this step, the area of the triangle mesh is determined based on coordinate information of a vertex of the triangle mesh in the model information. When three-dimensional coordinates of the three vertices of the triangle mesh are known, lengths of three edges may be determined based on the three-dimensional coordinates of the three vertices, and then the area of the triangle mesh may be determined by using Heron's formula.

Step S113: Determine the triangle mesh with an area of 0 as the to-be-deleted mesh.

In some aspects, an area of the triangle mesh that meets one of the following conditions is 0: three internal angles are (180°, 0°, 0°) or (90°, 90°, 0°); a length of one of the three edges is 0; or a length of one edge is equal to a sum of the other two. In this aspect of this application, the triangle mesh with an area of 0 is referred to as the degenerate surface, and the triangle mesh with an area of 0 is determined as the to-be-deleted mesh.

Step S114: Delete the to-be-deleted mesh from the model information to obtain the processed model information.

Step S115: Output a prompt message that the three-dimensional model does not meet the expansion condition, and end the procedure.

Through the foregoing steps S111 to S115, before performing the expansion processing on the three-dimensional model, it can first be determined whether the three-dimensional model meets the expansion condition. When it is determined that the three-dimensional model meets the expansion condition, the degenerate surface with an area of 0 in the three-dimensional model is deleted. This ensures that the expansion processing performed on the three-dimensional model can be executed correctly, thereby ensuring accuracy of the expansion result.

In some aspects, the foregoing step S102 "Determine a rigid transformation matrix of each triangular patch based on coordinate information of each triangular patch in the initial expansion result" may be implemented through the following steps.

Step S1021: Determine the initial deformation matrix of each triangular patch based on the coordinate information of each triangular patch in the initial expansion result.

It is assumed that two-dimensional coordinates of three vertices of the triangular patch T are respectively $(u_{0,T}, v_{0,T})$, $(u_{1,T}, v_{1,T})$, and $(u_{2,T}, v_{2,T})$, and local two-dimensional coordinates on the plane in which the triangular patch is located in the three-dimensional space are respectively $(\hat{x}_{0,T}, \hat{y}_{0,T})$, $(\hat{x}_{1,T}, \hat{y}_{1,T})$, and $(\hat{x}_{2,T}, \hat{y}_{2,T})$. In this case, an initial deformation matrix of the triangular patch T can be obtained by using Formula (1-3):

$$J_T = \begin{pmatrix} u_{1,T} - u_{0,T} & u_{2,T} - u_{0,T} \\ v_{1,T} - v_{0,T} & v_{2,T} - v_{0,T} \end{pmatrix} \begin{pmatrix} \hat{x}_{1,T} - \hat{x}_{0,T} & \hat{x}_{2,T} - \hat{x}_{0,T} \\ \hat{y}_{1,T} - \hat{y}_{0,T} & \hat{y}_{2,T} - \hat{y}_{0,T} \end{pmatrix}^{-1} \quad (1\text{-}3)$$

Step S1022: Perform the singular value decomposition on the initial deformation matrix of each triangular patch to obtain the decomposition result corresponding to each triangular patch.

The singular value decomposition (SVD) is an important matrix decomposition in linear algebra. The singular value decomposition is a generalization of eigendecomposition on any matrix. Through performing the singular value decomposition on the initial deformation matrix $J_T$ of the triangular patch T, the following decomposition result is obtained:

$$J_T = U\Sigma V^T \quad (1\text{-}4)$$

It is assumed that $J_T$ is an m*m order matrix. In this case, U is an m*m order unitary matrix, Σ is a positive semidefinite m*m order diagonal matrix. $V^T$, namely, a conjugate transpose of V, is an m*m order unitary matrix. An element Σi on a diagonal of Σ is a singular value of M.

Step S1023: Determine the rigid transformation matrix of each triangular patch based on decomposition results corresponding to each triangular patch.

After the decomposition results corresponding to each triangular patch are obtained, the rigid transformation matrix of the triangular patch may be determined based on Formula (1-5):

$$R_T = UV^T \quad (1\text{-}5)$$

It is to be noted that the foregoing steps S1021 to S1023 are performed independently for each triangular patch. Therefore, steps S1021 to S1023 are referred to as local steps in some aspects. Through executing the foregoing steps S1021 to S1023, the rigid transformation matrix is determined on the premise that the deformation matrix of the triangular patch is known, thereby providing a data basis for a subsequent use of the rigid transformation matrix to determine the target expansion result.

Figure 5:
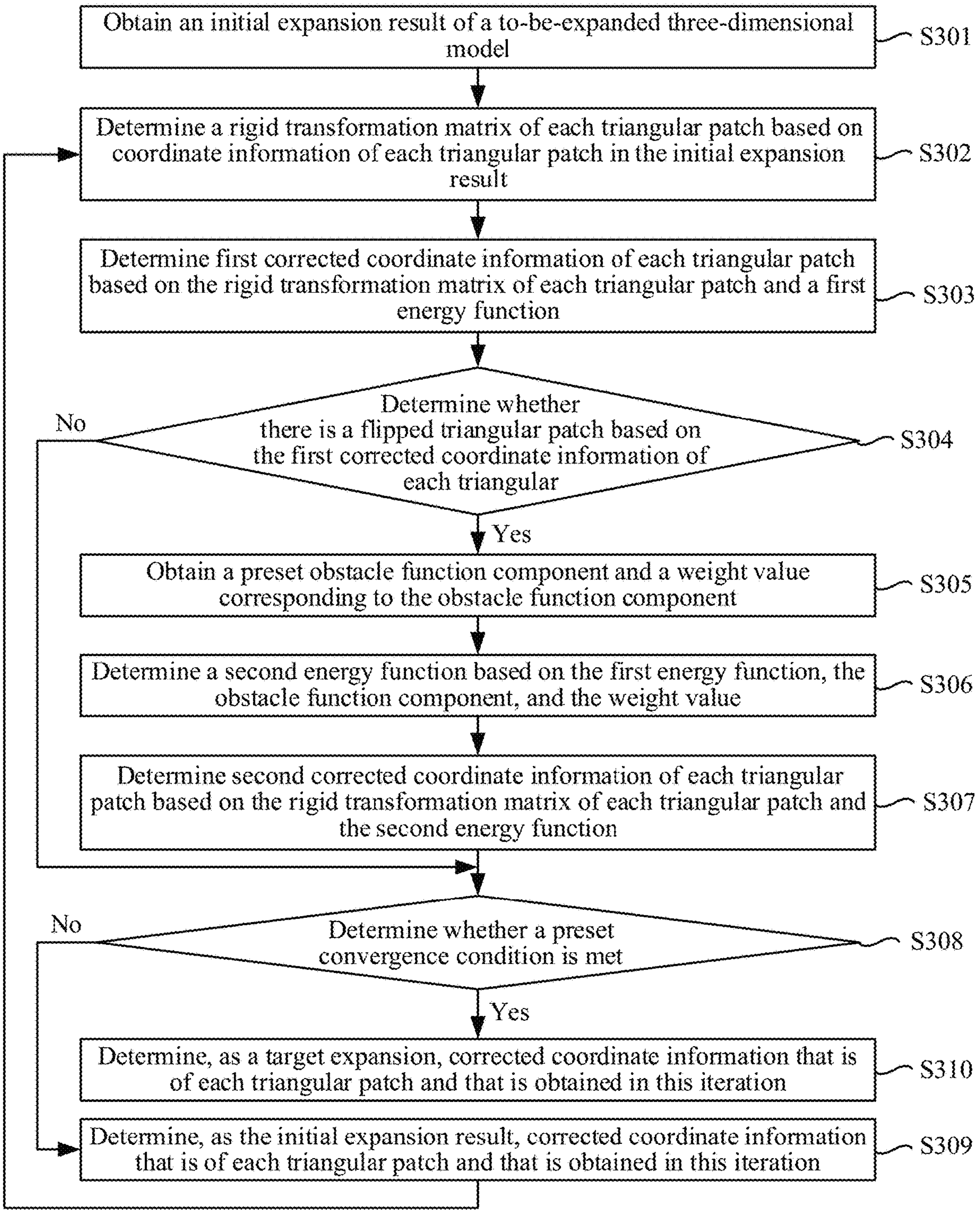
FIG. 5 is a schematic diagram of another implementation procedure of an expansion method for a three-dimensional model according to one or more illustrative aspects described herein.

Based on the foregoing aspects, aspects of this application further provides an expansion method for a three-dimensional model. FIG. 5 is a schematic diagram of another implementation procedure of an expansion method for a three-dimensional model according to an aspect of this application. The following describes, with reference to FIG. 5, the expansion method for a three-dimensional model provided in aspects of this application.

Step S301: Obtain an initial expansion result of a to-be-expanded three-dimensional model, none of triangular patches included in the initial expansion result is flipped.

Step S302: Determine a rigid transformation matrix of each triangular patch based on coordinate information of each triangular patch in the initial expansion result.

Step S303: Determine first corrected coordinate information of each triangular patch based on the rigid transformation matrix of each triangular patch and a first energy function.

It is to be noted that, an implementation process of the foregoing steps S301 to S303 is the same as an implementation process of steps S101 to S103.

Step S304: Determine whether there is a flipped triangular patch based on the first corrected coordinate information of each triangular patch.

During implementation of this step, first, refer to Formula (1-3), a deformation matrix of each triangular patch is determined based on the first corrected coordinate information of each triangular patch, then a determinant of the deformation matrix of each triangular patch is obtained, and finally whether each determinant is greater than 0 is determined. When there is a determinant less than 0, it is determined that there is a flipped triangular patch, and step S305 is performed. When there is no determinant less than 0, it is determined that there is no flipped triangular patch, and step S308 is performed.

Step S305: Obtain a preset obstacle function component and a weight value corresponding to the obstacle function component.

The obstacle function component is used to prevent the expanded triangular patch from flipping. In this aspect of this application, the obstacle function component can be represented as $$\sum_T A_T B(J_T),$$

$B(J_T)$ in the obstacle function component uses a symmetric Dirichlet energy, which can be represented by using Formula (1-6):

$$B(J_T) = \sigma_1^2 + \sigma_2^2 + \sigma_1^{-2} + \sigma_1^{-2} \quad (1\text{-}6)$$

$\sigma_1$ and $\sigma_2$ are singular values of a deformation matrix $J_T$. The function satisfies the following properties:

If and only when $\sigma_1=\sigma_2=1$ takes the minimum value, the deformation matrix $J_T$ is the rigid transformation matrix. Therefore, the function may alternatively be used as a measure of deformation distortion. When the determinant of the deformation matrix $J_T$ gradually decreases to close to 0, because $\det(J_T)=\sigma_1\sigma_2$, at least one of $\sigma_1$ and $\sigma_2$ tends to 0, that is, $B(L_T)$ tends to infinity. This indicates that the symmetric Dirichlet energy meets a requirement of the obstacle function component, and may help to alleviate distortion if optimized.

The weight value may be a positive real number less than 1. In an actual application, the weight value may be a real number less than 1 and close to 0. This can reduce an impact of the obstacle function on energy when there is no flipped triangular patch. For example, the weight value may be 0.1, 0.05, 0.01 or the like.

Step S306: Determine a second energy function based on the first energy function, the obstacle function component, and the weight value.

During implementation, a weighted sum is performed on the first energy function and the obstacle function component to obtain the second energy function, that is, the second energy function may be obtained by using Formula (1-7):

$$E = \sum_T A_T \|J_T - R_T\|_F^2 + \lambda \sum_T A_T B(J_T) \quad (1\text{-}7)$$

λ is the weight value.

Step S307: Determine second corrected coordinate information of each triangular patch based on the rigid transformation matrix of each triangular patch and the second energy function.

In the foregoing Formula (1-7), $A_T$ represents an area of a triangular patch T, which is determined based on the three-dimensional coordinate corresponding to the triangular patch. $J_T$ represents a deformation matrix of the triangular patch T, where the deformation matrix of the triangular patch may be represented by the three-dimensional coordinate and the two-dimensional coordinate of the triangular patch, and Rr represents a rigid transformation matrix corresponding to the triangular patch T. The rigid transformation matrix corresponding to the triangular patch T has been determined in step S302. Therefore, in Formula (1-7), $A_T$ and $R_T$ are both known quantities, and $J_T$ needs to be solved. $J_T$ is represented by the local two-dimensional coordinate corresponding to the three-dimensional coordinate of the triangular patch and a two-dimensional UV coordinate. The three-dimensional coordinate of the triangular patch is known. Therefore, through performing minimization solving on the second energy function based on the rigid transformation matrix of each triangular patch, a minimum energy value corresponding to this iteration is obtained and the corrected coordinate information of each triangular patch when the minimum energy value is reached is obtained.

Step S308: Determine whether a preset convergence condition is met.

In some aspects, at least two of the following manners may be used to determine whether the convergence condition is met.

First manner: Obtain a preset energy threshold, and determine that the preset convergence condition is met when a minimum energy value corresponding to this iteration is less than the energy threshold.

Second manner: Obtain a preset energy difference threshold, determine an energy difference between a minimum energy value corresponding to previous iteration and a minimum energy value corresponding to this iteration, and when the energy difference is less than the energy difference threshold, determine that the preset convergence condition is met.

When it is determined that the convergence condition is not met, step S309 is performed. When it is determined that the convergence condition is met, step S310 is performed.

Step S309: Determine, as the initial expansion result, corrected coordinate information that is of each triangular patch and that is obtained in this iteration, and perform step S302.

When step S308 is performed after it is determined in step S304 that there is no flipped triangular patch, the corrected coordinate information obtained in this iteration is the first corrected coordinate information. In this case, in this step, the first corrected coordinate information is determined as the initial expansion result. When step S308 is performed after executing step S307, the corrected coordinate information obtained in this iteration is the second corrected coordinate information. In this case, in this step, the second corrected coordinate information is determined as the initial expansion result.

Step S310: Determine, as a target expansion result, corrected coordinate information that is of each triangular patch and that is obtained in this iteration.

Similar to step S309, the corrected coordinate information obtained in this iteration is the first corrected coordinate information or the second corrected coordinate information. When step S308 is performed after it is determined in step S304 that there is no flipped triangular patch, the corrected coordinate information obtained in this iteration is the first corrected coordinate information. In this case, in this step, the first corrected coordinate information is determined as the target expansion result. When step S308 is performed after executing step S307, the corrected coordinate information obtained in this iteration is the second corrected coordinate information, and then the second corrected coordinate information is determined as the target expansion result.

In the expansion method for a three-dimensional model provided in this aspect of this application, first, the initial expansion result of the to-be-expanded three-dimensional model is obtained, where the triangular patches included in the initial expansion result are not flipped. Then, the rigid transformation matrix of each triangular patch is determined based on the coordinate information of each triangular patch in the initial expansion result, and the first corrected coordinate information of each triangular patch is determined based on the rigid transformation matrix of each triangular patch and the first energy function. When it is determined, based on the coordinate information of each triangular patch, that there is a flipped triangular patch, the second corrected coordinate information of each triangular patch is determined based on the rigid transformation matrix of each triangular patch and the second energy function. Because the second energy function is obtained by performing the weighted sum on the first energy function and the obstacle function component, and the obstacle function component can prevent the expanded triangular patch from flipping, in other words, in this case, each triangular patch corresponding to the second corrected coordinate information of each triangular patch obtained in this case is not flipped. Finally, if it is determined that the preset convergence condition is met, the target expansion result is determined based on the corrected coordinate information of each triangular patch. Based on that calculation duration is not greatly increased, a UV expansion result is not flipped, so that more complex three-dimensional mesh regions are allowed to be performed with the UV expansion, and a high-quality UV expansion result without flipping is obtained. This alleviates an undercutting on the three-dimensional mesh and reduce a slit length, thereby improving the quality of the UV expansion result.

The following describes an example application of aspects of this application in an actual application scenario.

An aspect of this application provides an expansion method for a three-dimensional model. During implementation, first the three-dimensional model is preprocessed, then an as-rigid-as-possible UV expansion without flipping is performed. The following describes an implementation process of the expansion method for a three-dimensional model provided in this aspect of this application.

1. Preprocess the Three-Dimensional Model.

In a preprocessing procedure, mesh regions of a to-be-inputted model are first detected and the mesh region that cannot be performed with the UV expansion is eliminated. Then, some defects affecting a progress of an algorithm on the mesh regions are repaired.

Generally, not all three-dimensional mesh regions can be performed with the UV expansion. Therefore, in this aspect of this application, it is required that a to-be-inputted three-dimensional mesh region is an orientable and manifold triangle mesh whose geometric topology is a disc with or without a hole and does not include a degenerate surface.

The algorithm of the UV expansion requires that a to-be-inputted mesh is a triangle mesh due to a triangle has many good properties. For example, the triangle necessarily be located on the same plane, points inside the triangle have unique and continuous barycenter coordinates with respect to a vertex, and any two triangles on the plane can be deformed and converted into each other by a linear transformation. These properties are theoretical bases of many algorithms of the UV expansion. The to-be-inputted mesh may include a non-triangular surface such as a quadrilateral and a pentagon. Therefore, for such situations, the non-triangular surface is to be triangulated in the preprocessing procedure to convert a general mesh into the triangle mesh required by the algorithm.

Figure 6:
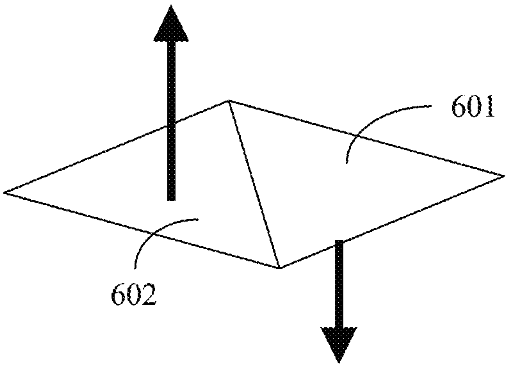
FIG. 6 is a schematic diagram of non-orientability.

The orientability requires that the mesh region cannot include non-orientable adjacent surfaces. For the non-orientable adjacent surfaces, as shown in FIG. 6, after flattened, the two surfaces (601 and 602) have opposite normals.

Figure 7A:
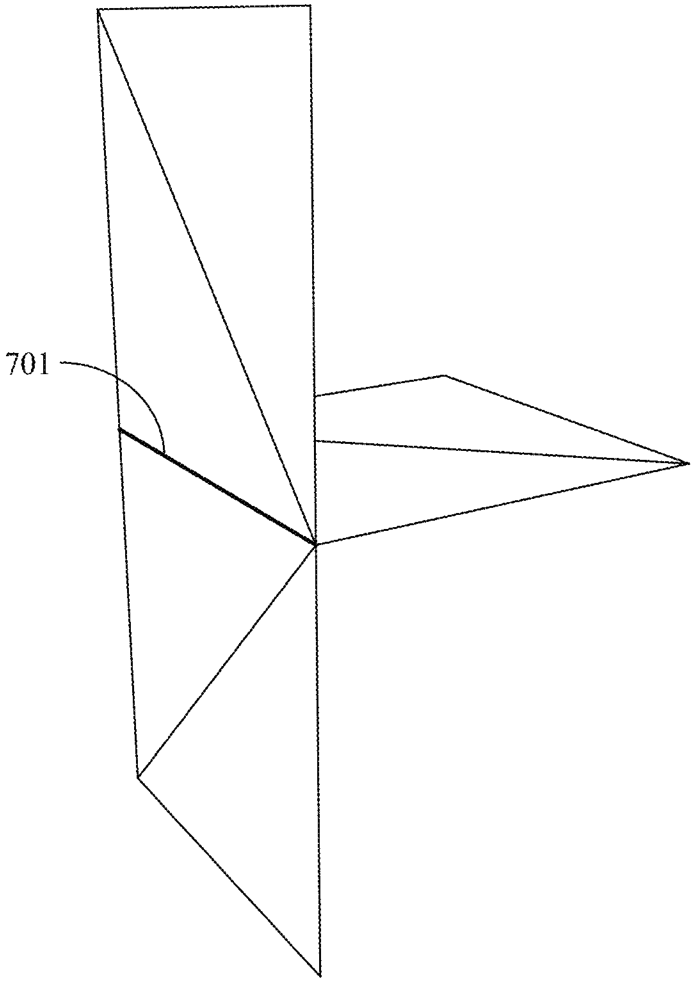
FIG. 7A is a schematic diagram of a non-manifold edge.
Figure 7B:
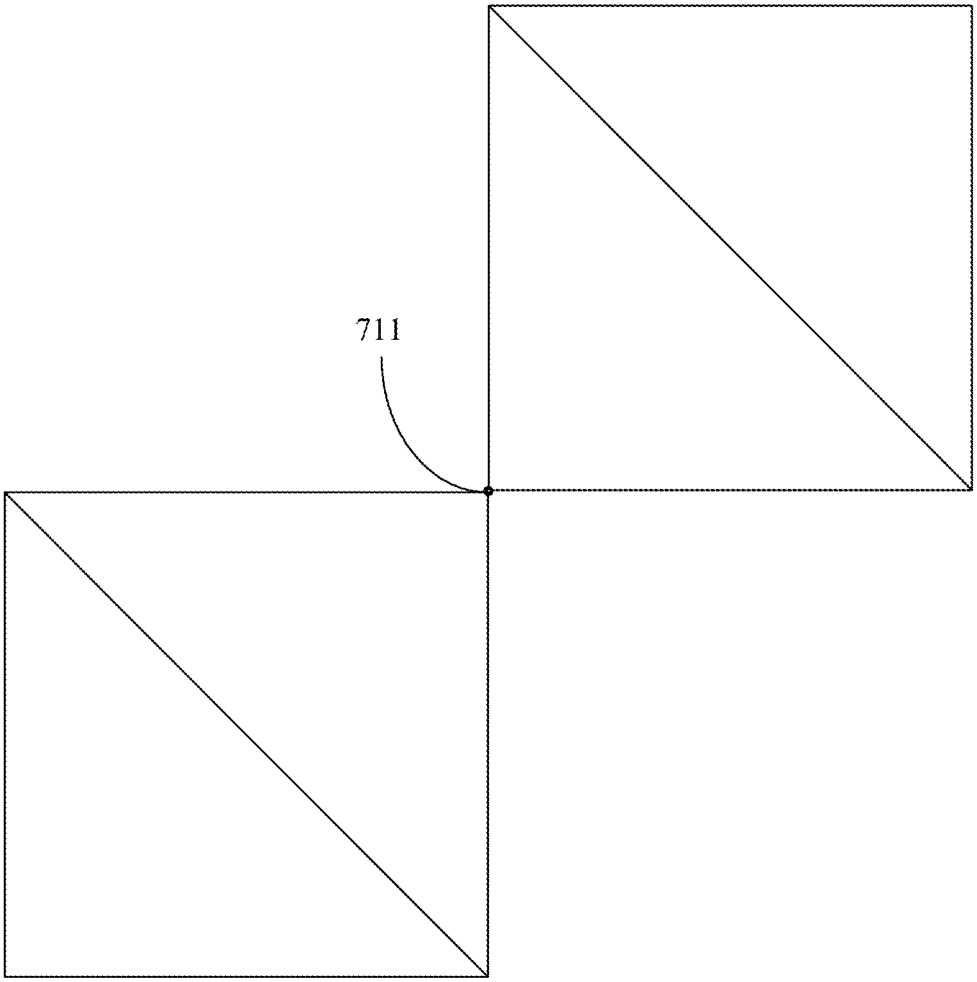
FIG. 7B is a schematic diagram of a non-manifold vertex.

The manifold triangle mesh requires that the mesh cannot include a non-manifold edge 701 shown in FIG. 7A and a non-manifold vertex 711 shown in FIG. 7B. The non-manifold edge refers to an edge with more than two adjacent surfaces, and the non-manifold vertex refers to a vertex whose adjacent surfaces are not connected and form a whole in a manner of edge adjacency.

If the mesh to be performed with the UV expansion includes a non-orientable and non-manifold region, the algorithm is caused to fail. Therefore, the two situations are detected in the preprocessing procedure, and if any situation exist, the algorithm is stopped and a corresponding prompt is given.

The geometric topology is a way of classifying surfaces. If two surfaces can be deformed from one to the other by continuous stretching without damage, the two surfaces belong to the same type of geometric topology. For orientable manifold meshes, the meshes having the same type of geometric topology have the same Euler characteristic (quantity of vertices−quantity of edges+quantity of surfaces) and the same quantity of boundaries. Based on relevant theories, only a mesh region whose geometric topology is a disc with or without a hole can be performed with the UV expansion. This is equivalent to that the mesh region needs to satisfy two conditions in which a sum of the Euler characteristic and the quantity of boundaries is two and the quantity of boundaries is greater than 0.

TABLE 1

Comparison table of Euler characteristic, quantity of boundaries, and whether can be performed with UV expansion for different geometric topologies

| Disc without a hole | Disc with three holes | Cube | Torus |
|---|---|---|---|
| Euler characteristic = 1 | Euler characteristic = −2 | Euler characteristic = 2 | Euler characteristic = 0 |
| Quantity of boundaries = 1 | Quantity of boundaries = 4 | Quantity of boundaries = 0 | Quantity of boundaries = 0 |
| Can be performed with UV expansion | Can be performed with UV expansion | Cannot be performed with UV expansion | Cannot be performed with UV expansion |

The geometric topology of the mesh can be changed by making cutting on the surface, and this can convert a mesh region that cannot be performed with the UV expansion into a mesh region whose geometric topology is a disc with or without a hole. Therefore, an input to the algorithm of the UV expansion is generally a mesh region with a slit. In the preprocessing procedure, the Euler characteristic and the quantity of boundaries of the mesh region with a slit is calculated, to check whether a geometric topology is a disc with or without a hole. If not, the algorithm is stopped and a corresponding prompt is given.

The degenerate surface refers to a triangular surface with an area of 0, and an existence of such a surface causes a failure of many algorithm of the UV expansion. However, a game art does not have such a requirement when making a model. As a result, a resulting model often has the degenerate surface. In the preprocessing procedure, the degenerate surface is removed and an original connection relationship in the mesh region is retained between non-degenerated surfaces.

2. Perform the as-Rigid-as-Possible UV Expansion without Flipping.

Figure 8:
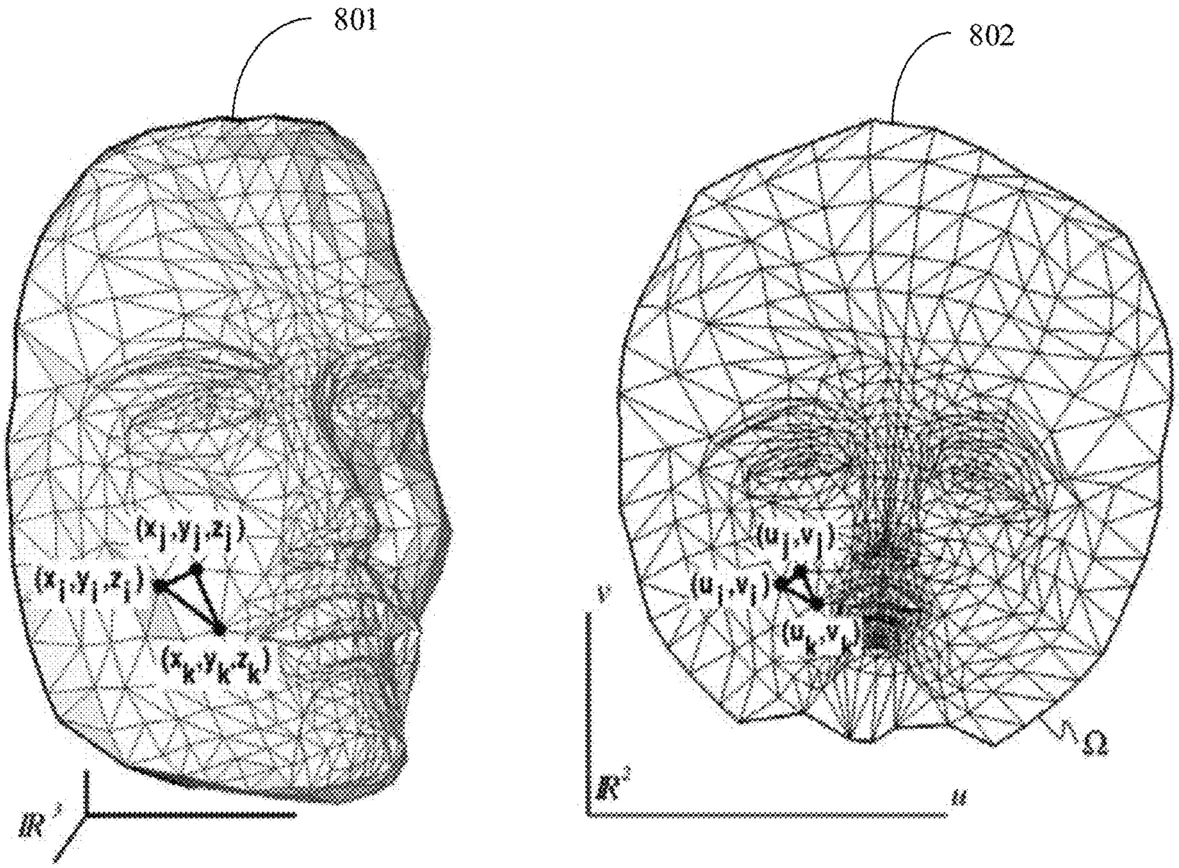
FIG. 8 is a schematic diagram of expanding a three-dimensional model to obtain a two-dimensional image.

First, a principle of the as-rigid-as-possible UV expansion is described. The UV expansion is a process of finding a two-dimensional UV mesh corresponding to a mesh in three-dimensional space. After the preprocessing process, the to-be-inputted three-dimensional mesh is preprocessed to an orientable and manifold triangle mesh whose geometric topology is a disc with or without a hole and does not include a degenerate surface. FIG. 8 shows an example of the UV expansion, where 801 is the three-dimensional mesh, and 802 is a result of the UV expansion.

After performing the UV expansion on a triangle mesh in three-dimensional space, a correspondence to a triangle on a two-dimensional plane is also existed on each triangular surface. Because a triangle in the three-dimensional space necessarily be on one plane, the correspondence may also be regarded as a deformation between two triangles on the two-dimensional plane. Based on the properties of the triangle, the deformation is a linear transformation and therefore can be represented by a matrix.

If the transformation is rigid (rotation or translation), this does not change a shape of the triangle, in other words, this does not cause a distortion. Based on this principle, an algorithm of the as-rigid-as-possible UV expansion solves the UV expansion by making this transformation as close as possible to a rigid transformation, that is, the first energy function shown in Formula (1-1) is minimized:

$$E = \sum_T A_T \|J_T - R_T\|_F^2 \qquad (1\text{-}1)$$

A subscript T represents a surface of the triangle mesh, $A_T$ represents an area of the triangular surface T, $J_T$ represents a deformation matrix representing the triangular surface T, which may be obtained by using Formula (1-3), and $R_T$ represents a rigid transformation matrix corresponding to the triangular surface T. A two-dimensional rigid transformation matrix satisfies the following Formula (2-1):

$$R_{T(i,j)} = \begin{pmatrix} \cos\theta_{i,j} & -\sin\theta_{i,j} \\ \sin\theta_{i,j} & \cos\theta_{i,j} \end{pmatrix} \qquad (2\text{-}1)$$

Figure 9:
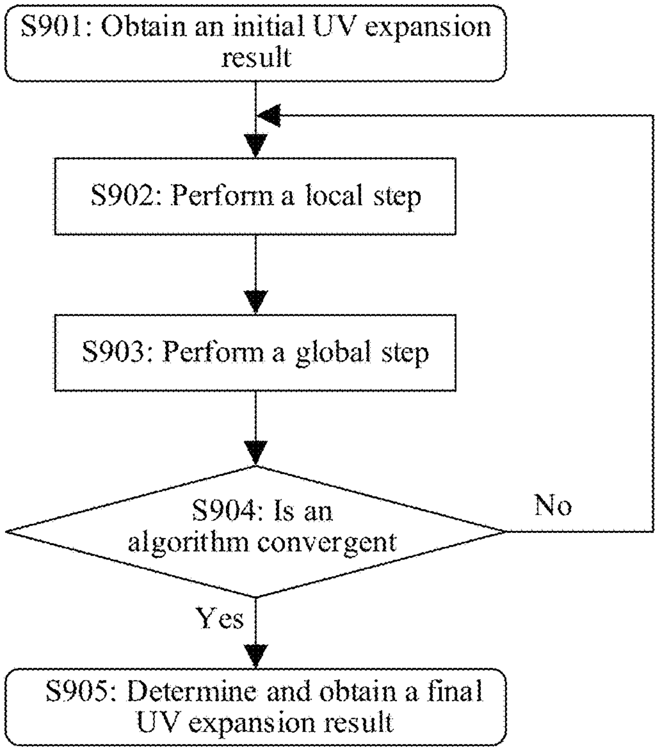
FIG. 9 is a schematic diagram of an implementation of minimizing energy by using a local-global step according to one or more illustrative aspects described herein.

The first energy function has a relatively complex form, which brings difficulties to the solution. Therefore, a local-global policy is adopted in this aspect of this application. A process of minimizing energy is shown in FIG. 9 and may include the following steps.

Step S901: Obtain an initial UV expansion result.

Step S902: Perform a local step.

In this step, $J_T$ in the energy is regarded as a known quantity to solve $R_T$, that is, a deformation matrix $J_T$ of each triangular surface Tis known, and a rigid transformation matrix $R_T$ is to be solved. During implementation, singular value decomposition is performed on a matrix $L_T$, that is, $J_T=U\Sigma V^T$, where a matrix U and a matrix V are both rigid transformation matrices. In this case, $R_T=UV^T$. This step is performed respectively and independently for each triangle. Therefore, the step is referred to as the local step.

Step S903: Perform a global step.

In this step, $R_T$ in the first energy function is regarded as a known quantity to solve $J_T$, that is, a rigid transformation matrix $R_T$ of each triangular surface T is known, and a deformation matrix is to be resolved. $J_T$ is obtained from UV coordinates. Therefore, $J_T$ of different triangles are related to each other, and a whole process needs to be solved globally. However, $R_T$ is known. As a result, the problem becomes a quadratic energy unconstrained problem, and only a linear equation system shown in Formula (2-2) needs to be solved:

$$\sum_{j\in N(i)}[\cot(\theta_{ij})+\cot(\theta_{ji})]\begin{pmatrix}u_i-u_j\\ v_i-v_j\end{pmatrix}= \sum_{j\in N(i)}[\cot(\theta_{ij})R_{T(i,j)}+\cot(\theta_{ji})R_{T(j,i)}]\begin{pmatrix}\hat{x}_i-\hat{x}_j\\ \hat{y}_i-\hat{y}_j\end{pmatrix}; \tag{2-2}$$

i=1, 2, . . . , n, and j=1, 2, . . . , n, where n is a total quantity of vertices.

Step S904: Determine whether an algorithm is convergent.

During implementation, it can be determined whether a minimum energy obtained when executing the global step is less than a preset energy threshold. When the minimum energy is less than the energy threshold, the algorithm is determined to be convergent. It can also be determined whether an absolute difference between the minimum energy obtained by executing the global step this time and minimum energy obtained by executing the global step last time is less than a difference threshold. When the absolute difference is less than the difference threshold, the algorithm is determined to be convergent. When it is determined that the algorithm is convergent, step S905 is performed. When it is determined that the algorithm is not convergent, step S902 is performed.

Step S905: Determine and obtain a final UV expansion result.

In the foregoing steps S901 to S905, based on an initial UV expansion result with insufficient quality (that is, the initial deformation matrix $J_T$) obtained by another method, the local step and the global step are iteratively performed until the algorithm is convergent, to obtain the final UV expansion result.

Through the foregoing steps S901 to S905, a UV expansion result with a lower degree of distortion can be obtained. However, a problem of flipping is not considered. As a result, the result is prone to occur flipping. A UV expansion without flipping is equivalent to that determinants of the deformation matrix of each triangular surface are positive, that is, $\det(J_T)>0$. This is a nonlinear constraint, adding it directly to the energy in the global step makes the solution being extremely difficult. Therefore, an interior point method is considered to be used to solve this problem. This ensures that there is no flipping in the initial UV expansion result and ensures that no flipping occurs in each iteration, thereby ensuring that there is no flipping in the result.

Figure 10:
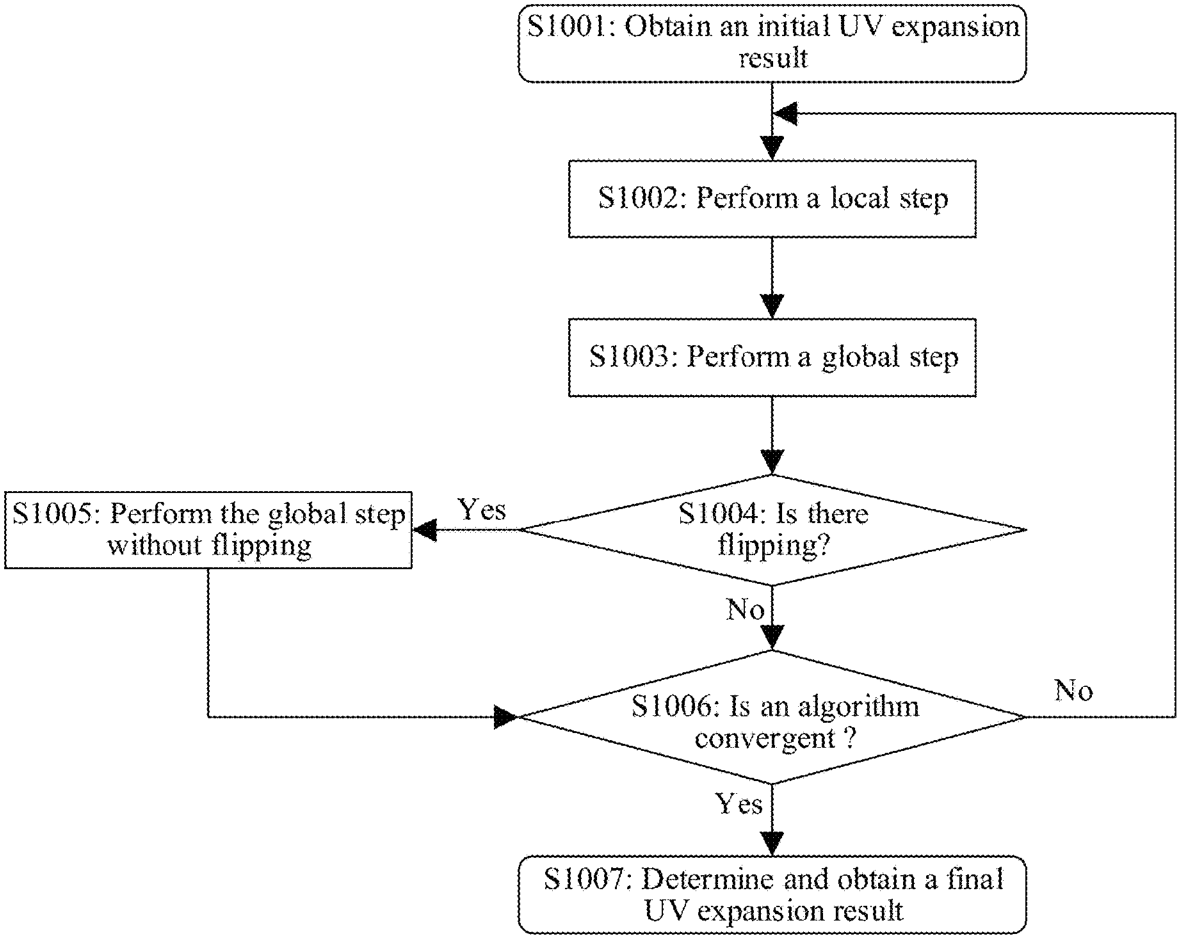
FIG. 10 is a schematic diagram of still another implementation procedure of an expansion method for a three-dimensional model according to one or more illustrative aspects described herein.

Aspects of this application further provide an expansion method for a three-dimensional model. The expansion method can ensure that there is no flipping in an obtained expansion result. FIG. 10 is a schematic diagram of still another implementation procedure of an expansion method for a three-dimensional model according to an aspect of this application. As shown in FIG. 10, the procedure includes the following steps.

Step S1001: Obtain an initial UV expansion result.

Step S1002: Perform a local step.

Step S1003: Perform a global step.

An implementation process of the foregoing steps S1002 to S1003 is same as that of steps S902 to S903, and the implementation process of steps S902 to S903 can be referred.

Step S1004: Determine whether there is a flipping.

During implementation of this step, it can be determined whether determinants corresponding to a deformation matrix of each triangular surface are all greater than 0. If determinants corresponding to the deformation matrix of each triangular surface are all greater than 0, it is determined that there is no flipping, and step S1006 is performed. If there is a triangular surface whose determinant is less than 0, it is determined that there has flipping, and step S1005 is performed.

Step S1005: Perform the global step with no flipping.

During implementation of this step, an obstacle function component is added to the foregoing minimum energy function formula (1-1) to obtain a second energy function formula (1-7):

$$E=\sum_T A_T\|J_T-R_T\|_F^2+\lambda\sum_T A_T B(J_T); \tag{1-7}$$

$B(J_T)$ in the obstacle function component uses a symmetric Dirichlet energy, which can be represented by the foregoing Formula (1-6):

$$B(J_T)=\sigma_1^2+\sigma_2^2+\sigma_1^{-2}+\sigma_1^{-2}; \tag{1-6}$$

$\sigma_1$ and $\sigma_2$ are singular values of a deformation matrix $J_T$. The function satisfies the following properties:

If and only when $\sigma_1=\sigma_2=1$ takes the minimum value, the deformation matrix $J_T$ is the rigid transformation matrix. Therefore, the function can also be used as a measure of deformation distortion. When the determinant of the deformation matrix $J_T$ gradually decreases to close to 0, because $\det(J_T)=\sigma_1\sigma_2$, at least one of $\sigma_1$ and $\sigma_2$ tends to 0, that is, $B(J_T)$ tends to infinity. This indicates that the symmetric Dirichlet energy meets a requirement of the obstacle function component, and can help to alleviate distortion if optimized.

Step S1006: Determine whether an algorithm is convergent.

If the algorithm is convergent, step S1007 is performed. If the algorithm is not convergent, step S1002 is performed.

Step S1007: Determine and obtain a final UV expansion result.

On each triangular surface, $B(J_T)$ has a small value when the determinant of the deformation matrix is positive and an absolute value thereof is larger. Once the determinant of the deformation matrix decreases to close to 0, $B(J_T)$ increases rapidly to infinity to prevent the determinant of the deformation matrix becoming negative. However, after being added with the obstacle function component, the global step becomes an unconstrained problem of non-quadratic energy, which can only be solved by using an optimized method such as a gradient descent method, a Newton method, and a quasi-Newton method, and the speed is slower than that of solving an equation. Therefore, to combine the advantages of both, in the aspect including the foregoing steps S1001 to S1007, the global step without flipping is performed only when a common global step occurs flipping.

It can be seen from the foregoing analysis that the as-rigid-as-possible UV expansion without flipping requires an initial UV expansion obtained by another method. The method for this initial UV expansion is to be simple and fast, and a result thereof being without flipping, and allowing a higher degree of distortion for the result. Common simpler algorithms of the UV expansion include a "least squares conformal" method and a "Tutte embedding" method.

Figure 11:
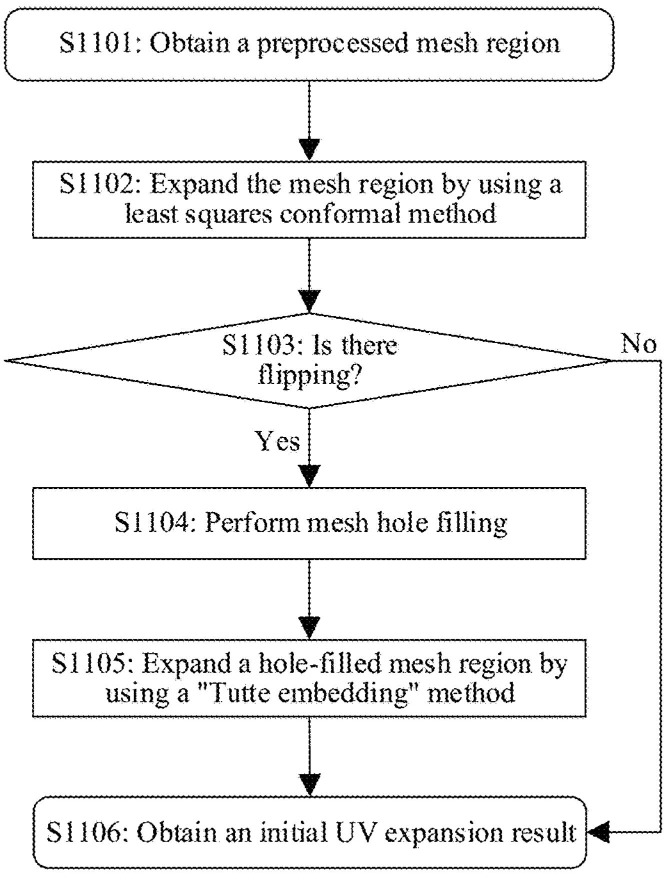
FIG. 11 is a schematic diagram of another implementation procedure of obtaining an initial expansion result according to one or more illustrative aspects described herein.

The least squares conformal is a conformal (angle preserving) mapping method, with a lower degree of angle distortion but a higher degree of area distortion, and can handle the mesh region whose geometric topology is a disc with or without a hole, but may cause flipping. Although the "Tutte embedding" method can theoretically guarantee no flipping, it can only handle a mesh region whose geometric topology is a disc with or without a hole. This method maps a three-dimensional mesh to a two-dimensional convex polygon (such as a rectangular or circular) given by a user, having an extremely high degree of distortion. Both the two methods only need to solve a linear equations system to obtain a result, and a calculation speed is fast. To combine advantages of the two, for an input mesh region, first the "least squares conformal" method is used for expanding, and then whether there is flipping is checked. If there is no flipping, use it as the initial UV expansion result, otherwise, the input mesh region is performed with a hole filling, and then the "Tutte embedding" method is used to obtain the initial UV expansion result. The implementation procedure of obtaining the initial UV expansion result is shown in FIG. 11, including the following steps.

Step S1101: Obtain a preprocessed mesh region.

Step S1102: Expand the mesh region by using the least squares conformal method.

Step S1103: Determine whether an expansion result has flipping.

If the expansion result has flipping, step S1104 is performed. If the expansion result has no flipping, step S1106 is performed.

Step S1104: Perform mesh hole filling.

Step S1105: Expand a hole-filled mesh region by using the "Tutte embedding" method.

Step S1106: Obtain an initial expansion result.

Figure 12:
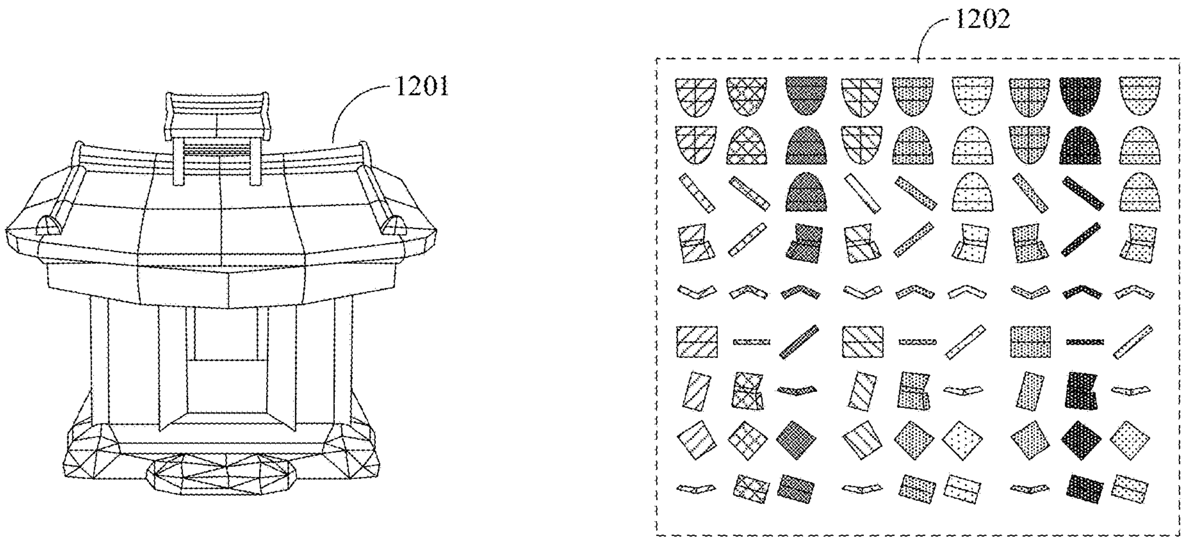
FIG. 12 is a schematic diagram of a to-be-expanded three-dimensional model and an expansion result of the to-be-expanded three-dimensional model.

FIG. 12 is a schematic diagram of a to-be-expanded three-dimensional model and an expansion result of the to-be-expanded three-dimensional model. As shown in FIG. 12, a to-be-expanded three-dimensional model 1201 is performed with two-dimensional expansion by using the expansion method provided in aspects of this application, and an expansion result is obtained as shown in 1202. It can be seen from 1202 that there is no flipping in the expansion result of the to-be-expanded three-dimensional model.

In the expansion method for the to-be-expanded three-dimensional model provided in aspects of this application, based on that calculation duration is not significantly increased, flipping in a UV expansion result is avoided, thereby allowing more complex three-dimensional mesh areas to be performed with UV expansion and obtaining a high-quality UV expansion result without flipping. This alleviates an undercutting on the three-dimensional mesh and reduce a slit length, thereby improving the quality of the UV expansion result. The method also allows manual or automated tools to consider more important factors such as hard edge, visibility, and symmetry instead of a success rate of the expansion when selecting a slit, thereby improving the quality of UV expansion result.

It may be understood that aspects of this application relate to user information such as model information of a three-dimensional model and other related data. When aspects of this application are applied to specific products or technologies, user permission or user agreement is required, and collection, use and processing of relevant data need to comply with relevant laws, regulations and standards of relevant countries and regions.

The following continues to describe an example structure in which an expansion apparatus 455 for a three-dimensional model provided in aspects of this application is implemented as a software module. In some aspects, as shown in FIG. 2, the software module in the expansion apparatus 455 for a three-dimensional model stored in a memory 450 may include:

a first obtaining module 4551, configured to obtain an initial expansion result of a to-be-expanded three-dimensional model, where none of a plurality of triangular patches included in the initial expansion result is flipped; a first determining module 4552, configured to determine a rigid transformation matrix of each triangular patch based on coordinate information of each triangular patch in the initial expansion result; a second determining module 4553, configured to determine first corrected coordinate information of each triangular patch based on the rigid transformation matrix of each triangular patch and a first energy function; a third determining module 4554, configured to determine second corrected coordinate information of each triangular patch based on the rigid transformation matrix of each triangular patch and a second energy function when it is determined, based on the first corrected coordinate information of each triangular patch, that there is a flipped triangular patch, where the second energy function includes an obstacle function component that can prevent the triangular patch from flipping; and a fourth determining module 4555, configured to determine a target expansion result based on the second corrected coordinate information of each triangular patch when it is determined that a preset convergence condition is met.

In some aspects, the first obtaining module 4551 is further configured to: obtain model information of the to-be-expanded three-dimensional model and preprocess the model information to obtain processed model information; perform two-dimensional expansion processing on the processed model information by using a first preset algorithm to obtain a candidate expansion result, where the first preset algorithm is a conformal mapping method; and determine the candidate expansion result as the initial expansion result when it is determined that a triangular patch in the candidate expansion result is not flipped.

In some aspects, the apparatus further includes: a fifth determining module, configured to determine whether the processed model information includes a hole when it is determined that there is a flipped triangular patch in the candidate expansion result; a hole filling module, configured to perform hole filling processing on the processed model information to obtain hole-filled model information when it is determined that the processed model information includes a hole; and a two-dimensional expansion module, configured to perform two-dimensional expansion processing on the processed model information by using a second preset algorithm to obtain the initial expansion result, where the second preset algorithm is an expansion method without flipping.

In some aspects, the first obtaining module 4551 is further configured to:

determine whether the model information meets an expansion condition, where the expansion condition includes that the model is orientable, the model does not include a non-manifold edge and a non-manifold vertex, and a geometric topology is a disc with or without a hole; determine an area of each triangle mesh based on the model information when it is determined that the model information meets the expansion condition; determine a triangle mesh with an area of 0 as a to-be-deleted mesh; and delete the to-be-deleted mesh from the model information to obtain the processed model information.

In some aspects, the first determining module 4552 is further configured to: determine an initial deformation matrix of each triangular patch based on the coordinate information of each triangular patch in the initial expansion result; perform singular value decomposition on the initial deformation matrix of each triangular patch to obtain a decomposition result corresponding to each triangular patch; and determine the rigid transformation matrix of each triangular patch based on the decomposition result corresponding to each triangular patch.

In some aspects, the apparatus further includes: a sixth determining module, configured to determine a deformation matrix of each triangular patch based on the first corrected coordinate information of each triangular patch; a seventh determining module, configured to determine a determinant of the deformation matrix of each triangular patch; and an eighth determining module, configured to determine whether each determinant is greater than 0, and when there is a determinant less than 0, it is determined that there is a flipped triangular patch.

In some aspects, the apparatus further includes: a second obtaining module, configured to obtain a preset obstacle function component and a weight value corresponding to the obstacle function component; and a ninth determining module, configured to determine the second energy function based on the first energy function, the obstacle function component, and the weight value.

In some aspects, the third determining module 4554 is further configured to: perform minimization solving on the second energy function based on the rigid transformation matrix of each triangular patch, to obtain a minimum energy value corresponding to this iteration and obtain the second corrected coordinate information of each triangular patch when the minimum energy value is reached.

In some aspects, the apparatus further includes: a third obtaining module, configured to obtaining a preset energy threshold; and a tenth obtaining module, configured to: when the minimum energy value corresponding to this iteration is less than the energy threshold, determine that the preset convergence condition is met.

In some aspects, the apparatus further includes: a fourth obtaining module, configured to obtain preset energy difference threshold; an eleventh determining module, configured to determine an energy difference between a minimum energy value corresponding to previous iteration and the minimum energy value corresponding to this iteration; and a twelfth determining module, configured to: when the energy difference is less than the energy difference threshold, determine that the preset convergence condition is met.

It is to be noted that, descriptions of the expansion apparatus for a three-dimensional model in the aspect of this application are similar to the descriptions of the foregoing method aspects, which have beneficial effects similar to those of the method aspects. Refer to descriptions in the method aspects of this application for technical details undisclosed in the apparatus aspect of this application.

An aspect of this application provides a computer program product or a computer program, the computer program product or the computer program including computer instructions, and the computer instructions being stored in a computer-readable storage medium. A processor of a computer device reads the computer instructions from the computer-readable storage medium, and executes the computer instructions, to enable the computer device to perform the foregoing expansion method for a three-dimensional model in aspects of this application.

An aspect of this application provides a computer-readable storage medium storing executable instructions. When the executable instructions are executed by a processor, the processor is caused to perform the expansion method for a three-dimensional model provided in aspects of this application, such as the expansion method for a three-dimensional model shown in FIG. 3 and FIG. 5.

In some aspects, the computer-readable storage medium may be a memory such as an FRAM, a ROM, a PROM, an EPROM, an EEPROM, a flash memory, a magnetic memory, a compact disc, or a CD-ROM; or may be various devices including one of or any combination of the foregoing memories.

In some aspects, the executable instructions may be written in any form of programming language (including a compiled or interpreted language, or a declarative or procedural language) by using the form of a program, software, a software module, a script or code, and may be deployed in any form, including being deployed as an independent program or being deployed as a module, a component, a subroutine, or another unit suitable for use in a computing environment.

As an example, the executable instructions may, but do not necessarily, correspond to a file in a file system, and may be stored in a part of a file that saves another program or other data, for example, may be stored in one or more scripts in a hypertext markup language (HTML) file, may be stored in a file that is specially used for a program in discussion, or may be stored in a plurality of collaborative files (for example, files storing one or more modules, subprograms, or code parts).

As an example, the executable instructions may be deployed to be executed on one computing device, or deployed to be executed on a plurality of computing devices at the same location, or deployed to be executed on a plurality of computing devices that are distributed in a plurality of locations and interconnected by using a communication network.

The foregoing descriptions are merely aspects of this application and are not intended to limit the protection scope of this application. Any modification, equivalent replacement, or improvement made without departing from the spirit and range of this application shall fall within the protection scope of this application.

What is claimed is:

1. A method comprising:

obtaining, by a computing device, a to-be-expanded three-dimensional model;

determining that the to-be-expanded three-dimensional model meets an expansion condition, wherein the expansion condition comprises that the model is orientable, the model does not comprise a non-manifold edge and a non-manifold vertex, and a geometric topology is a disc;

determining a geometric area of each triangle mesh in the three-dimensional model;

deleting one or more triangle meshes based on the determined geometric area of the one or more triangle meshes being zero;

obtaining, based on remaining triangle meshes, an initial expansion result of the to-be-expanded three-dimensional model, wherein none of a plurality of triangular patches in the initial expansion result are flipped;

determining a rigid transformation matrix of each triangular patch based on coordinate information of each triangular patch in the initial expansion result;

determining first corrected coordinate information of each triangular patch based on the rigid transformation matrix of each triangular patch and a first energy function;

determining, when there is a flipped triangular patch within the first corrected coordinate information, second corrected coordinate information of each triangular patch based on the rigid transformation matrix of each triangular patch and a second energy function, wherein the second energy function comprises the first energy function and an obstacle function component that can prevent the triangular patch from flipping;

determining the second corrected coordinate information of each triangular patch as a target expansion result when a preset convergence condition is met; and generating, by the computing device based on the target expansion result, a two-dimensional image representing a two-dimensional expansion of the to-be-expanded three-dimensional model.

2. The method according to claim 1, wherein the obtaining an initial expansion result of a to-be-expanded three-dimensional model comprises:

obtaining model information of the to-be-expanded three-dimensional model, and preprocessing the model information to obtain processed model information;

performing two-dimensional expansion processing on the processed model information by using a first preset algorithm to obtain a candidate expansion result, wherein the first preset algorithm uses a conformal mapping method; and determining the candidate expansion result as the initial expansion result based on determining that a triangular patch in the candidate expansion result is not flipped.

3. The method according to claim 2, wherein the method further comprises:

performing hole filling processing on the processed model information based on a determination that there is a flipped triangular patch in the candidate expansion result and the processed model information comprises a hole, to obtain hole-filled model information; and performing two-dimensional expansion processing on the processed model information by using a second preset algorithm to obtain the initial expansion result, wherein the second preset algorithm is an expansion method without flipping.

4. The method according to claim 2, wherein determining the geometric area of each triangle mesh is based on the model information.

5. The method according to claim 1, wherein the determining a rigid transformation matrix of each triangular patch based on coordinate information of each triangular patch in the initial expansion result comprises:

determining an initial deformation matrix of each triangular patch based on the coordinate information of each triangular patch in the initial expansion result;

performing singular value decomposition on the initial deformation matrix of each triangular patch to obtain a decomposition result corresponding to each triangular patch; and determining the rigid transformation matrix of each triangular patch based on the decomposition result corresponding to each triangular patch.

6. The method according to claim 1, wherein the method further comprises:

determining a deformation matrix of each triangular patch based on the first corrected coordinate information of each triangular patch;

determining a determinant of the deformation matrix of each triangular patch; and based on there being a determinant less than 0, determining that there is a flipped triangular patch.

7. The method according to claim 1, wherein the method further comprises:

obtaining a preset obstacle function component and a weight value corresponding to the obstacle function component; and determining the second energy function based on the first energy function, the obstacle function component, and the weight value.

8. The method according to claim 1, wherein the determining second corrected coordinate information of each triangular patch based on the rigid transformation matrix of each triangular patch and a second energy function comprises:

performing minimization solving on the second energy function based on the rigid transformation matrix of each triangular patch to obtain a minimum energy value and;

repeating the determining the second corrected coordinate information of each triangular patch based on the minimum energy value.

9. The method according to claim 8, wherein the method further comprises:

obtaining a preset energy threshold; and based on the minimum energy value being less than the preset energy threshold, determining that the preset convergence condition is met.

10. The method according to claim 8, wherein the method further comprises:

obtaining a preset energy difference threshold between a previous iteration and a current iteration;

determining an energy difference between a previous minimum energy value and the minimum energy value; and based on the energy difference being less than the energy difference threshold, determining that the preset convergence condition is met.

11. The method of claim 1, further comprising:

repeating, when the preset convergence condition is not met, the determining the second corrected coordinate information until the preset convergence condition is met.

12. One or more non-transitory computer readable media comprising computer readable instructions which, when executed, configure a data processing system to perform:

obtaining a to-be-expanded three-dimensional model;

determining that the to-be-expanded three-dimensional model meets an expansion condition, wherein the expansion condition comprises that the model is orientable, the model does not comprise a non-manifold edge and a non-manifold vertex, and a geometric topology is a disc;

determining a geometric area of each triangle mesh in the three-dimensional model;

deleting one or more triangle meshes based on the determined geometric area of the one or more triangle meshes being zero;

obtaining, based on remaining triangle meshes, an initial expansion result of the to-be-expanded three-dimensional model, wherein none of a plurality of triangular patches in the initial expansion result are flipped;

determining a rigid transformation matrix of each triangular patch based on coordinate information of each triangular patch in the initial expansion result;

determining first corrected coordinate information of each triangular patch based on the rigid transformation matrix of each triangular patch and a first energy function;

determining, when there is a flipped triangular patch within the first corrected coordinate information, second corrected coordinate information of each triangular patch based on the rigid transformation matrix of each triangular patch and a second energy function, wherein the second energy function comprises the first energy function and an obstacle function component that can prevent the triangular patch from flipping;

determining the second corrected coordinate information of each triangular patch as a target expansion result in a case that it is determined that a preset convergence condition is met; and generating, based on the target expansion result, a two-dimensional image representing a two-dimensional expansion of the to-be-expanded three-dimensional model.

13. The computer readable media according to claim 12, wherein the obtaining an initial expansion result of a to-be-expanded three-dimensional model comprises:

obtaining model information of the to-be-expanded three-dimensional model, and preprocessing the model information to obtain processed model information;

performing two-dimensional expansion processing on the processed model information by using a first preset algorithm to obtain a candidate expansion result, wherein the first preset algorithm uses a conformal mapping method; and determining the candidate expansion result as the initial expansion result based on determining that a triangular patch in the candidate expansion result is not flipped.

14. The computer readable media according to claim 13, wherein the computer readable instructions, when executed, further configure the data processing system to perform:

performing hole filling processing on the processed model information based on a determination that there is a flipped triangular patch in the candidate expansion result and the processed model information comprises a hole, to obtain hole-filled model information; and performing two-dimensional expansion processing on the processed model information by using a second preset algorithm to obtain the initial expansion result, wherein the second preset algorithm is an expansion method without flipping.

15. The computer readable media according to claim 13, wherein the determining the geometric area of each triangle mesh is based on the model information.

16. The computer readable media according to claim 12, wherein the determining a rigid transformation matrix of each triangular patch based on coordinate information of each triangular patch in the initial expansion result comprises:

determining an initial deformation matrix of each triangular patch based on the coordinate information of each triangular patch in the initial expansion result;

performing singular value decomposition on the initial deformation matrix of each triangular patch to obtain a decomposition result corresponding to each triangular patch; and determining the rigid transformation matrix of each triangular patch based on the decomposition result corresponding to each triangular patch.

17. The computer readable media according to claim 12, wherein the computer readable instructions, when executed, further configure the data processing system to perform:

determining a deformation matrix of each triangular patch based on the first corrected coordinate information of each triangular patch;

determining a determinant of the deformation matrix of each triangular patch; and based on there being a determinant less than 0, determining that there is a flipped triangular patch.

18. The computer readable media according to claim 12, wherein the computer readable instructions, when executed, further configure the data processing system to perform:

obtaining a preset obstacle function component and a weight value corresponding to the obstacle function component; and determining the second energy function based on the first energy function, the obstacle function component, and the weight value.

19. The computer readable media according to claim 12, wherein the determining second corrected coordinate information of each triangular patch based on the rigid transformation matrix of each triangular patch and a second energy function comprises:

performing minimization solving on the second energy function based on the rigid transformation matrix of each triangular patch to obtain a minimum energy value and;

obtaining the second corrected coordinate information of each triangular patch based one the minimum energy value.

20. The computer readable media according to claim 19, wherein the computer readable instructions, when executed, further configure the data processing system to perform:

obtaining a preset energy threshold; and based on the minimum energy value being less than the preset energy threshold, determining that the preset convergence condition is met.

21. The computer readable media according to claim 19, wherein the computer readable instructions, when executed, further configure the data processing system to perform:

obtaining a preset energy difference threshold;

determining an energy difference between a previous minimum energy value and the minimum energy value; and based on the energy difference being less than the energy difference threshold, determining that the preset convergence condition is met.

22. A data processing device, comprising:

one or more processors controlling operations of the data processing device; and memory storing computer readable instructions which, when executed, configure the data processing device to perform:

obtaining a to-be-expanded three-dimensional model;

determining that the to-be-expanded three-dimensional model meets an expansion condition, wherein the expansion condition comprises that the model is orientable, the model does not comprise a non-manifold edge and a non-manifold vertex, and a geometric topology is a disc;

determining a geometric area of each triangle mesh in the three-dimensional model;

deleting one or more triangle meshes based on the determined geometric area of the one or more triangle meshes being zero;

obtaining, based on remaining triangle meshes, an initial expansion result of the to-be-expanded three-dimensional model, wherein none of a plurality of triangular patches in the initial expansion result are flipped;

determining a rigid transformation matrix of each triangular patch based on coordinate information of each triangular patch in the initial expansion result;

determining first corrected coordinate information of each triangular patch based on the rigid transformation matrix of each triangular patch and a first energy function;

determining, when there is a flipped triangular patch within the first corrected coordinate information, second corrected coordinate information of each triangular patch based on the rigid transformation matrix of each triangular patch and a second energy function, wherein the second energy function comprises the first energy function and an obstacle function component that can prevent the triangular patch from flipping;

determining the second corrected coordinate information of each triangular patch as a target expansion result in a case that it is determined that a preset convergence condition is met; and generating, based on the target expansion result, a two-dimensional image representing a two-dimensional expansion of the to-be-expanded three-dimensional model.

* * * * *